United States Patent
Braedt et al.

(10) Patent No.: US 11,919,606 B2
(45) Date of Patent: Mar. 5, 2024

(54) BICYCLE SPROCKET PAIRING

(71) Applicant: SRAM DEUTSCHLAND GmbH, Schweinfurt (DE)

(72) Inventors: Henrik Braedt, Dittelbrunn-OT Hambach (DE); Sebastian Heyna, Dittelbrunn-OT Hambach (DE)

(73) Assignee: SRAM DEUTSCHLAND GmbH, Schweinfurt (DE)

( * ) Notice: Subject to any disclaimer, the term of this patent is extended or adjusted under 35 U.S.C. 154(b) by 40 days.

(21) Appl. No.: 17/511,480

(22) Filed: Oct. 26, 2021

(65) Prior Publication Data

US 2022/0126949 A1   Apr. 28, 2022

(30) Foreign Application Priority Data

| Oct. 26, 2020 | (DE) | 10 2020 128 138.2 |
| Nov. 20, 2020 | (DE) | 10 2020 130 825.6 |
| Jan. 21, 2021 | (DE) | 10 2021 101 223.6 |

(51) Int. Cl.
   *B62M 9/12*   (2006.01)

(52) U.S. Cl.
   CPC .................. *B62M 9/12* (2013.01)

(58) Field of Classification Search
   CPC ........................................ B62M 9/12
   USPC ........................................ 474/78
   See application file for complete search history.

(56) References Cited

U.S. PATENT DOCUMENTS

| 6,340,338 | B1 * | 1/2002 | Kamada | B62M 9/122 |
| | | | | 474/160 |
| 8,066,603 | B2 * | 11/2011 | Braedt | B62M 9/10 |
| | | | | 474/160 |
| 2018/0073620 | A1 * | 3/2018 | Fukunaga | F16H 55/30 |
| 2018/0251189 | A1 * | 9/2018 | Kamada | F16H 55/30 |
| 2018/0299004 | A1 * | 10/2018 | Ohno | F16H 55/30 |
| 2019/0300109 | A1 * | 10/2019 | Yamazaki | F16H 55/30 |
| 2019/0359284 | A1 * | 11/2019 | Fukunaga | F16H 55/30 |

FOREIGN PATENT DOCUMENTS

| DE | 102017208945 | 12/2017 |
| DE | 102018133324 | 8/2019 |
| DE | 102019202810 | 10/2019 |
| DE | 102019206786 | 11/2019 |
| EP | 1188658 | 11/2005 |

* cited by examiner

*Primary Examiner* — Gene O Crawford
*Assistant Examiner* — Emily R Kincaid

(57) ABSTRACT

A bicycle rear-wheel sprocket pairing for engaging in a meshing, force-transmitting and form-fitting manner with a bicycle roller chain, wherein the rear-wheel sprocket pairing is rotatable about a sprocket axis. The sprocket axis defines an axial direction running along the sprocket axis, a radial direction running so as to be orthogonal to the sprocket axis, and a circumferential direction encircling the sprocket axis. The rear-wheel sprocket pairing comprises a larger sprocket and a smaller sprocket which for rotating conjointly with the larger sprocket in a slip-free manner about the sprocket axis is connected to the larger sprocket so as to be coaxial with and axially directly adjacent to the latter. The larger sprocket has an even tooth count of equal to or less than twenty-two teeth, and the difference in the tooth count between the larger and the smaller sprocket is exactly two teeth.

21 Claims, 15 Drawing Sheets

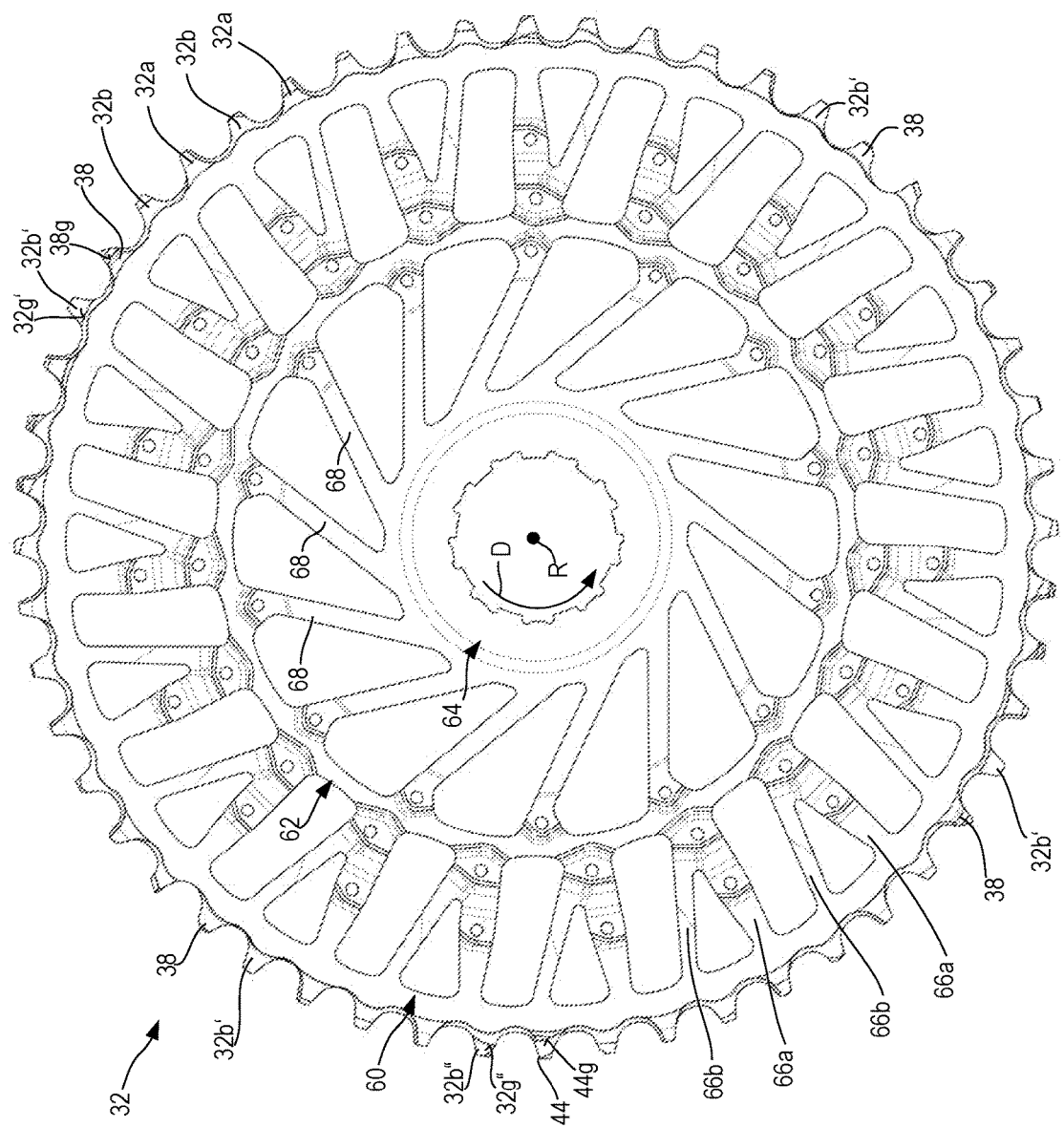
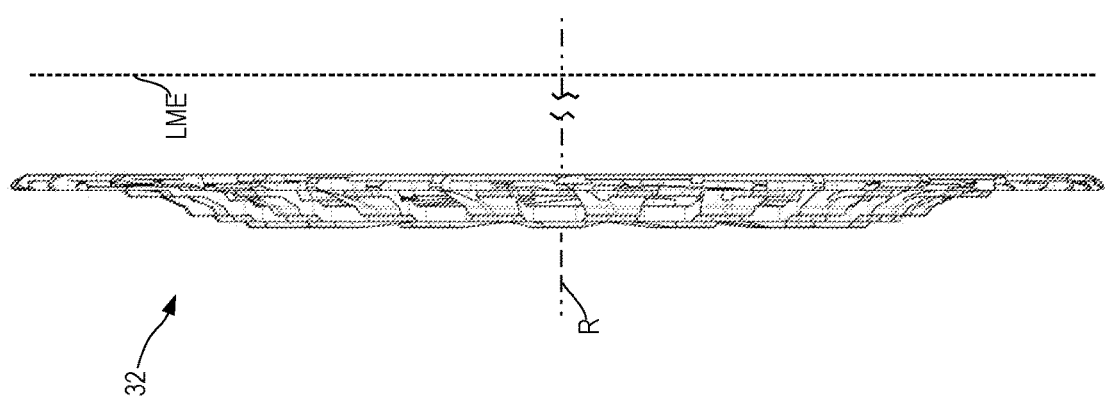

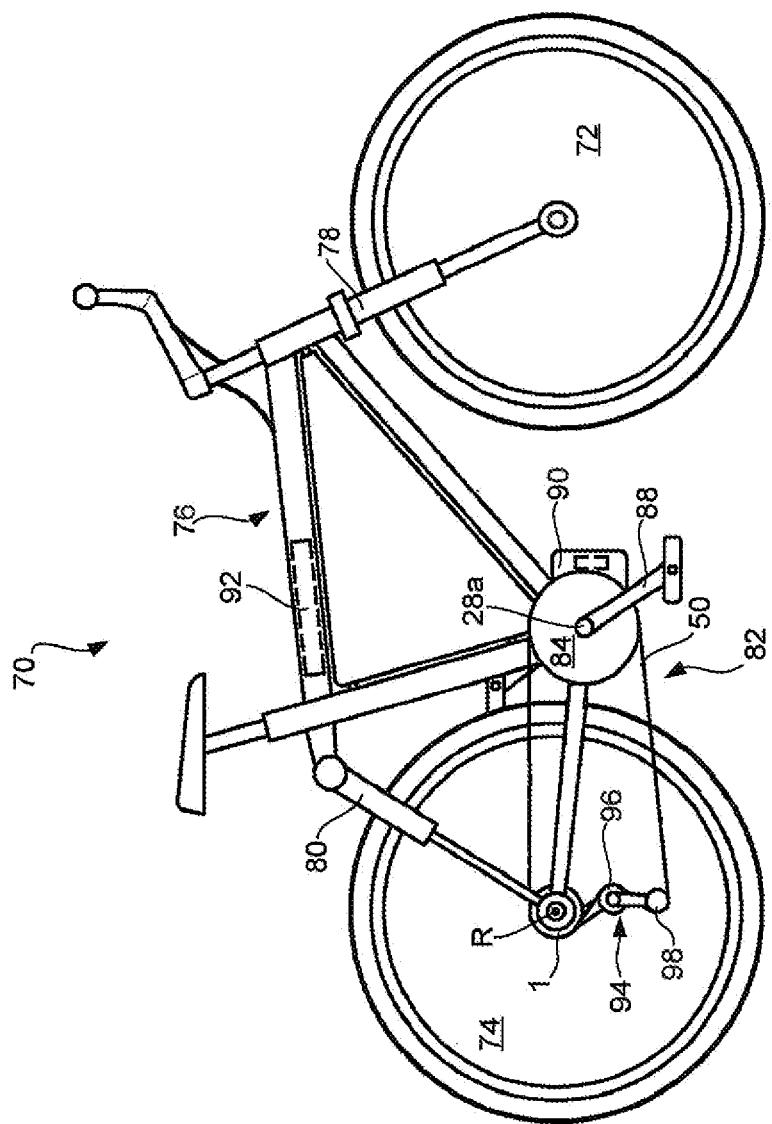

BICYCLE SPROCKET PAIRING

PRIORITY

This application claims priority to, and/or the benefit of, German patent applications DE 10 2020 128 138.2, filed on Oct. 26, 2020, DE 10 2020 130 825.6, filed on Nov. 20, 2020, and DE 10 2021 101 223.6 filed on Jan. 21, 2021, the contents of which are included by reference herein in their entirety.

FIELD OF THE DISCLOSURE

The present disclosure relates to a bicycle rear-wheel sprocket pairing for engaging in a meshing, force-transmitting and form-fitting manner to a bicycle roller chain. The rear-wheel sprocket pairing is rotatable about a sprocket axis. The sprocket axis defines an axial direction running along the sprocket axis, a radial direction running so as to be orthogonal to the sprocket axis, and a circumferential direction encircling the sprocket axis. The rear-wheel sprocket pairing comprises a larger sprocket and a smaller sprocket which for rotating conjointly with the larger sprocket in a slip-free manner about the sprocket axis is connected to the larger sprocket so as to be coaxial with and axially directly adjacent to the latter.

BACKGROUND

A rear-wheel sprocket cassette which comprises seven sprockets is known from EP 1 188 658 B1. The grading of the sprockets from the smallest, outermost sprocket to the largest, innermost sprocket is 11-13-15-17-21-25-29-33. The known sprocket cassette thus has only sprockets having odd tooth counts. The outermost sprocket here is the sprocket that is the most remote from the bicycle longitudinal central plane of a bicycle that supports the sprocket cassette, the bicycle longitudinal central plane being orthogonal to the sprocket axis. Accordingly, the innermost sprocket is the sprocket closest to the bicycle longitudinal central plane.

Bicycle roller chains which engage in a meshing manner in the rear-wheel sprocket and have a plurality of chain rollers which at a predetermined chain pitch spacing are disposed so as to be distant from one another in the chain longitudinal direction and which have chain link plates that connect the chain rollers are likewise known. The chain links of the known and customary bicycle roller chains are formed by link plate pairs, wherein inner link plate pairs and outer link plate pairs alternate successively in the chain longitudinal direction, the latter because of the closed encircling configuration of a bicycle roller chain also being a chain revolving direction. End regions of outer link plate pairs here overlap end regions of inner link plate pairs in a manner known per se, such that the end regions of an inner link plate pair are disposed between an end region of an outer link plate pair and the chain roller that is held between this end region, specifically in each case one inner link plate pair on each of the two end sides of the chain roller. The available width to be measured in the chain width direction, thus parallel to the roller axes of the chain rollers, between two inner link plates of an inner link pair is therefore smaller than the available width between two outer link plates of an outer link plate pair. The available width of a link plate pair defines the engagement space which is available for a tooth of a sprocket to engage with the roller chain. Consequently, narrow chain links defined by inner link plate pairs and wide chain links defined by outer link plate pairs as types of chain links alternate successively on the roller chain. By virtue of the inner link-plate chain links and outer link-plate chain links that alternate in the revolving direction of the chain, a bicycle roller chain always has an even number of chain links. The bicycle roller chain hereunder is also referred to in a simplified manner as a "bicycle chain" or "chain".

For the sake of simplicity, sprockets having odd tooth counts are also referred to below as "odd sprockets" and sprockets having even tooth counts are accordingly also referred to as "even sprockets".

It is disadvantageous in the case of odd sprockets that the assigned engagement of one and the same tooth to one type of chain link varies with each revolution of the bicycle chain. One and the same tooth in successive revolutions of the bicycle chain therefore engages alternatingly with a narrow inner link-plate chain link and a wide outer link-plate chain link. Each tooth of an odd sprocket therefore has to be configured such that the tooth can engage in a narrow chain link.

Physical weakening of the sprocket can result from the shifting conditions which are to be adhered to in order for repositioning the bicycle chain from the sprocket to the next smaller sprocket. This repositioning takes place, as is widely known, on the rear-wheel cassette by a derailleur, the chain guiding roller of the latter that guides the bicycle chain in a deflecting manner being disposed by a cyclist by way of corresponding force-transmitting mechanisms such as, for example, mechanically by a cable pull, or by an electric motor by way of a "shift-by-wire" system, in a manner coplanar with that sprocket that acquires the chain after the shift procedure. The chain is thus repositioned from the current chain-guiding sprocket to the future chain-guiding sprocket.

Recess formations in the form of planar recesses of the end side are configured on the sprockets on that end side that points towards the respective next smaller sprocket, link plates, typically outer link plates, of the bicycle chain, being able to at least in portions plunge into the recesses so as to be able to guide the chain axially close to the larger sprocket and to thus facilitate the shift procedure. Here there are upshift recess formations which for an upshift procedure facilitate the repositioning of the chain from the larger sprocket to the next smaller sprocket, and there are downshift recess formations which for a downshift procedure facilitate the repositioning of the chain from the adjacent small sprocket to the larger sprocket. The recess formations in terms of the form and/or the radially inner periphery thereof, when axially viewing a sprocket pairing composed of a larger and an adjacent smaller sprocket from the outside, thus having the smaller sprocket lying close to the observer, for the profile of the bicycle chain in the transition region between the smaller and the larger sprocket during the assigned shift procedure. This means that the upshift recess formation or/and a radially inner periphery of the latter, in the progression in the counterclockwise manner roughly approaches the smaller sprocket in the radial manner from a location on the larger sprocket that lies radially further outside, and the downshift recess formation or/and a radially inner periphery of the latter, in the progression in the clockwise direction roughly approaches the smaller sprocket in a radial manner from a location on the larger sprocket that lies radially further outside.

On sprockets, teeth are usually configured as release teeth which when upshifting to the next smaller sprocket engage last between the link plate pairs of a chain link before the chain leaves the larger sprocket towards the smaller sprocket. In the usual driving rotation directions of rear-wheel sprockets, thus in the clockwise direction when viewed for reference from the outside along the sprocket axis, a release tooth typically is adjacent to the assigned upshift recess formation thereof in the clockwise direction such that the chain while engaged with the release tooth can move past laterally and radially inside the teeth that are contiguous to the release tooth in the counterclockwise direction while utilizing the upshift recess formation as a space for movement.

Likewise, catch teeth for downshift procedures are configured on the larger sprocket, the catch teeth being intended to engage as first teeth with the bicycle chain that is to be repositioned to the larger sprocket. The bicycle chain here is moved axially closer to the larger sprocket while utilizing the downshift recess formation as a space for movement, such that the chain can initially move laterally and radially past the teeth that proceed the catch tooth in the clockwise direction, while utilizing the upshift recess formation as a space for movement, and the catch tooth as the first tooth of the sprocket can finally engage in the engagement space between two chain link plates. A catch tooth in the counterclockwise direction is therefore adjacent to the downshift recess formation assigned thereto.

In physical terms, a release tooth and a catch tooth are configured differently from other teeth of the sprocket so as to meet the respective engagement task thereof in the assigned shift procedure. The release tooth and the catch tooth can be configured having a tooth height, to be measured in the radial direction, that differs from the remaining sprocket teeth, or/and a tooth width, to be measured in the circumferential direction, that differs, or/and a tooth thickness, to be measured in the axial direction, that differs, or/and a tooth head shape that differs, or/and a design of at least one tooth flank that differs, or/and a position of one or both tooth lateral faces relative to the nearest sprocket end face thereof that differs, or/and a tooth inclination about an inclination axis orthogonal to the radial protrusion direction of the tooth that differs, or/and a tooth inclination about an inclination axis parallel to the radial protrusion direction of the tooth that differs, so as to act as the last engaging tooth when upshifting, or act as the first engaging tooth when downshifting, respectively.

Because of the larger engagement space, the catching of a chain on the larger sprocket of a sprocket pairing typically takes place on an outer link plate pair. Moreover, due to the system, outer link plates and thus outer link plate pairs can be moved axially closer on a sprocket than inner link plate pairs, because the outer link plates of a chain revolving on a smaller sprocket that face a larger sprocket always lie axially closer to the larger sprocket than the inner link plates that face the larger sprocket.

Because the assignment of a tooth to the type of chain link meshing with the tooth varies in an alternating manner per revolution of the sprocket in the case of odd sprockets, as has been described above, the manner how the chain is transferred to the larger sprocket in the case of the known sprocket cassettes depends on the number of revolutions that have been performed by the chain-guiding smaller sprocket up to the shift procedure. In order for the chain to be reliably caught without any undesirable latency, the latter being the temporal spacing between the initiation of a shift procedure by the cyclist and the actual performance of the shift procedure on the sprocket, two catch teeth are therefore provided directly behind one another in the circumferential direction on the larger sprocket such that at least one of the catch teeth comes to engage with an outer link plate pair when downshifting, the chain being caught as a result.

The same applies in an analogous manner to the release teeth when upshifting.

For facilitating the engagement with the chain that does not yet completely revolve, or no longer completely revolves, respectively, on the larger sprocket, catch teeth and release teeth often are configured so as to be thinner than other teeth which do not have to fulfil the tasks of the catch teeth and release teeth. In structural terms, this overall further weakens the catch teeth and the release teeth as well as the sprocket.

In comparison to the chain drive known from EP 1 188 658 B1, higher torques can be permanently transmitted specifically in the case of modern bicycle drives assisted by electric motors. Moreover, the gear spread, thus the difference of the tooth count between the largest sprocket and the smallest sprocket of a cassette divided by the tooth count of the smallest sprocket, has increased as a result of bicycle drives being assisted by electric motors. Moreover, the driving behaviour and the shift behaviour on bicycles assisted by electric motors has changed in comparison to bicycles which are driven only by muscular force.

As a result of the larger gear spread in comparison to the past, rear-wheel sprocket cassettes having a large number of sprockets have to be implemented in order to meet the requirement of the cyclists in terms of small gear leaps between individual adjacent sprockets. Minor gear leaps, thus the difference between the tooth counts of a sprocket pairing in relation to the tooth count of the smaller sprocket here are always in demand when the bicycle is driven only by muscular force without any assistance by an electric motor. The trends towards more voluminous tires and shorter chain stays often lead to the use of a comparatively small chain ring on the foot pedal. As a result, the permissible speed range in which the driving force of the cyclist is assisted by an electric motor according to the stipulations of most highway codes is increasingly moving towards smaller rear-wheel sprockets. In Germany, for example, assistance by an electric motor is permissible up to speed of 25 km/h, while this is up to 20 km/h or up to 30 km/h in other countries. Smaller sprockets of a sprocket cassette are therefore at risk of increased wear.

SUMMARY

According to one aspect of the present disclosure, a bicycle rear-wheel sprocket pairing is engageable in a force-transmitting manner with a bicycle roller chain and rotatable about a sprocket axis. The sprocket axis defines an axial direction running along the sprocket axis, a radial direction running so as to be orthogonal to the sprocket axis, and a circumferential direction encircling the sprocket axis. The rear-wheel sprocket pairing comprises a larger sprocket and a smaller sprocket which for rotating conjointly with the larger sprocket in a slip-free manner about the sprocket axis is connected to the larger sprocket so as to be coaxial with and axially directly adjacent to the latter. The larger sprocket has an even tooth count of equal to or less than twenty-two teeth, and wherein the difference in the tooth count between the larger and the smaller sprocket is exactly two teeth. The larger sprocket in an end side thereof that faces the smaller sprocket, along a portion of the circumference of the larger sprocket has an upshift region having an upshift recess formation. The upshift region, when axially viewing the rear-wheel sprocket pairing in a relative state in which the smaller sprocket lies closer to the observer than the larger sprocket, is configured and disposed so as to permit on the rear-wheel sprocket pairing rotating in the clockwise direction about the sprocket axis a change of engagement of the bicycle roller chain from the larger to the smaller sprocket. On the larger sprocket the upshift recess formation is assigned only exactly one release tooth which by way of the design and orientation thereof, when interacting with the upshift recess formation during an upshift procedure from the larger sprocket to the smaller sprocket, is configured to be the last tooth that engages between a link plate pair of a chain link of the bicycle roller chain. Additionally or alternately, the larger sprocket in the end side thereof that faces the smaller sprocket, along the circumference of the larger sprocket has a downshift region having a downshift recess formation. The downshift region, when axially viewing the rear-wheel sprocket pairing in the relative state, is configured so as to permit on the rear-wheel sprocket pairing rotating in the clockwise direction about the sprocket axis a change of engagement of the bicycle roller chain from the smaller to the larger sprocket. On the larger sprocket the downshift recess formation is assigned only exactly one catch tooth which by way of the design and orientation thereof, when interacting with the downshift recess formation during a downshift procedure from the smaller sprocket to the larger sprocket, is configured to be the first tooth that engages between link plates of a chain link of the bicycle roller chain.

According to one aspect of the present disclosure, a bicycle rear-wheel sprocket cassette comprises a plurality of sprockets which are connected for conjointly rotating in a slip-free manner about the sprocket axis and have in each case a different tooth count. The plurality of sprockets comprises at least one bicycle rear-wheel sprocket pairing for engaging in a force-transmitting manner with a bicycle roller chain and rotatable about a sprocket axis. The sprocket axis defines an axial direction running along the sprocket axis, a radial direction running so as to be orthogonal to the sprocket axis, and a circumferential direction encircling the sprocket axis. The at least one bicycle rear-wheel sprocket pairing comprises a larger sprocket and a smaller sprocket which for rotating conjointly with the larger sprocket in a slip-free manner about the sprocket axis is connected to the larger sprocket so as to be coaxial with and axially directly adjacent to the latter. The larger sprocket has an even tooth count of equal to or less than twenty-two teeth, and the difference in the tooth count between the larger and the smaller sprocket is exactly two teeth. The larger sprocket in an end side thereof that faces the smaller sprocket, along a portion of the circumference of the larger sprocket has an upshift region having an upshift recess formation. The upshift region, when axially viewing the rear-wheel sprocket pairing in a relative state in which the smaller sprocket lies closer to the observer than the larger sprocket, is configured and disposed so as to permit on the rear-wheel sprocket pairing rotating in the clockwise direction about the sprocket axis a change of engagement of the bicycle roller chain from the larger to the smaller sprocket. On the larger sprocket the upshift recess formation is assigned only exactly one release tooth which by way of the design and orientation thereof, when interacting with the upshift recess formation during an upshift procedure from the larger sprocket to the smaller sprocket, is configured to be the last tooth that engages between a link plate pair of a chain link of the bicycle roller chain. Additionally or alternatively, the larger sprocket in the end side thereof that faces the smaller sprocket, along the circumference of the larger sprocket has a downshift region having a downshift recess formation. The downshift region, when axially viewing the rear-wheel sprocket pairing in the relative state, is configured so as to permit on the rear-wheel sprocket pairing rotating in the clockwise direction about the sprocket axis a change of engagement of the bicycle roller chain from the smaller to the larger sprocket. On the larger sprocket the downshift recess formation is assigned only exactly one catch tooth which by way of the design and orientation thereof, when interacting with the downshift recess formation during a downshift procedure from the smaller sprocket to the larger sprocket, is configured to be the first tooth that engages between link plates of a chain link of the bicycle roller chain.

BRIEF DESCRIPTION OF THE DRAWINGS

The present disclosure will be explained in more detail hereunder by means of the appended drawings in which:

FIG. 10A shows the sprocket of FIG. 10, with a viewing direction orthogonal to the sprocket axis;

FIG. 10B shows the sprocket of FIG. 10 when viewed along the sprocket axis with a viewing direction away from the longitudinal central plane; and FIG. 11 shows a bicycle equipped with the sprocket cassette of FIGS. 1 to 1B.

DETAILED DESCRIPTION

Figure 1:
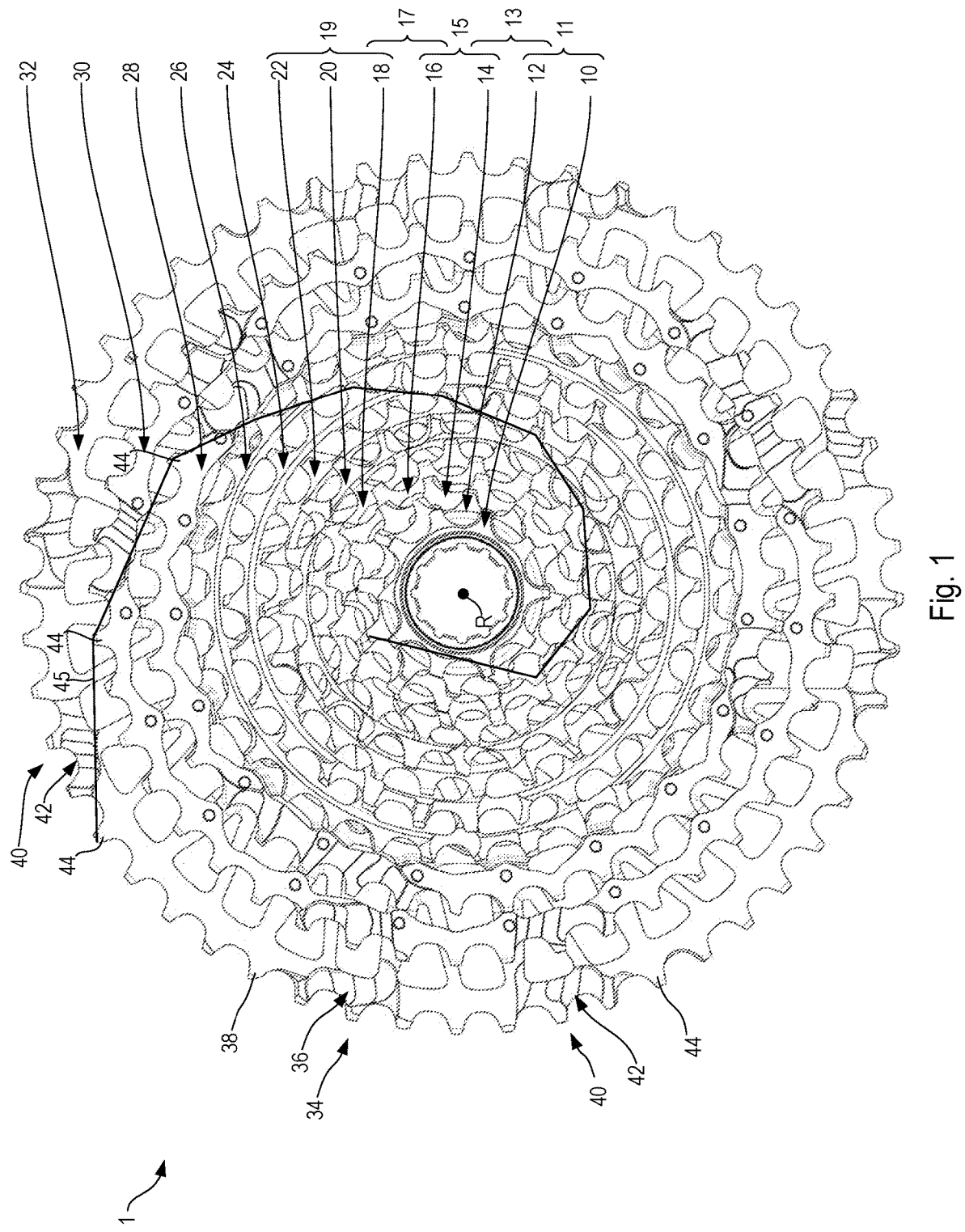
FIG. 1 shows a bicycle rear-wheel sprocket cassette according to one embodiment when viewed for reference along the sprocket axis, wherein increasingly larger sprockets are disposed at an increasing spacing from the observer.

Proceeding from the background described above, it is an object of the present disclosure to refine a bicycle rear-wheel sprocket pairing mentioned at the outset in such a manner that the sprocket pairing can be configured so as to be more stable and thus utilized for the operation under greater mechanical stress without increasing the requirement in terms of installation space.

The present disclosure may achieve this object in that the larger sprocket of the bicycle rear-wheel sprocket pairing mentioned at the outset has an even tooth count of equal to or less than 22 teeth. The difference in the tooth count between the larger and the smaller sprocket is exactly two teeth. Both sprockets of the sprocket pairing are thus even sprockets such that the assignment of the individual sprocket teeth to the type of chain link with which the former engages thus does not change for the duration of the engagement between the sprocket and the bicycle chain. When a tooth during a revolution thus engages in a meshing manner in an outer link-plate chain link, this tooth engages in an outer link-plate chain link in each revolution of the sprocket.

The larger sprocket in the end side thereof that points toward the smaller sprocket, along a portion of the circumference of the larger sprocket, has an upshift region having an upshift recess formation. As has been described above, the upshift region is configured and disposed so as to permit on the rear-wheel sprocket pairing rotating in the clockwise direction about the sprocket axis that change of engagement of the bicycle roller chain from the larger to the smaller sprocket.

It is typically only the upshift region that permits upshifting of the chain to the next smaller sprocket. Likewise, it is typically only a downshift region that permits downshifting of the chain from the next smaller sprocket to the larger sprocket.

When the clockwise direction and the counterclockwise direction are used as directional indications on the sprocket pairing in the present application, this always relates to the sprocket pairing, or a sprocket cassette containing the sprocket pairing, as viewed for reference in the axial direction, wherein the smaller sprocket of the sprocket pairing in this view is situated closer to the observer than the larger sprocket. Because the smaller sprocket on the rear wheel of the bicycle supporting the sprocket pairing is situated so as to be more remote from the bicycle longitudinal central plane orthogonal to the sprocket axis, and is thus situated "further outside", than the larger sprocket, the axial reference view hereunder is also referred to as the axial view "from the outside".

According to one aspect of the disclosure, the upshift recess formation on the larger sprocket is assigned only exactly one release tooth which by way of the design and orientation thereof, when interacting with the end-side upshift recess deformation during an upshift procedure from the larger sprocket to the smaller sprocket, is configured to be the last tooth that engages between a link plate pair of a chain link of the bicycle roller chain. When upshifting, as the last tooth of the larger sprocket only this specifically configured release tooth and no other tooth typically engages with the chain.

The provision of only one release tooth per upshift region has two advantages: firstly, the chain in terms of the chain link sequence thereof is transferred to the smaller wheel so as to be aligned in a defined manner because, as opposed to the prior art mentioned above, there are no longer two successive teeth in the circumferential direction, each of the teeth by way of the design and orientation being able to act as the last engaging tooth. The release tooth usually engages in an outer link-plate chain link, because that inner link-plate chain link which according to the reference view follows in the counterclockwise direction, by virtue of the narrow dimension thereof, on the end side of the larger sprocket that faces the smaller sprocket can slide more easily past that tooth that in the counterclockwise direction follows the release tooth and slide radially towards the inside. Secondly, it is sufficient for only this one release tooth to be configured as such. As has been described above, a release tooth in axial terms is typically thinner than a conventional tooth which is not a release tooth, so as to enable an axial movement of the bicycle chain towards the smaller sprocket. The number of teeth on the larger sprocket that are structurally weakened as a result of the reduction in terms of thickness can thus be reduced.

Additionally or alternatively, the larger sprocket in the end side thereof that points towards or faces the smaller sprocket, along the circumference of the larger sprocket has a downshift region having a downshift recess formation. As outlined above, the downshift region is configured so as to permit on the rear-wheel sprocket pairing rotating in the clockwise direction about the sprocket axis a change of engagement of the bicycle roller chain from the smaller to the larger sprocket.

Additionally or alternatively, the downshift recess formation on the larger sprocket is assigned only exactly one catch tooth which by way of the design and orientation thereof, when interacting with the end-side downshift recess formation during a downshift procedure from the smaller sprocket to the larger sprocket, is configured to be the first tooth that engages between link plates of a chain link of the bicycle roller chain. When downshifting to the larger sprocket, it is only the catch tooth that is typically configured to be the first tooth to engage in a chain link of the chain.

As a result of the described design embodiment of the downshift recess formation having only exactly one assigned catch tooth, the chain when downshifting from the smaller to the larger sprocket is acquired by the larger sprocket in a defined manner in terms of the chain link sequence of the chain. The catch tooth, by virtue of the design embodiment and orientation thereof engages in the chain that is to be repositioned to the larger sprocket only when an outer link-plate chain link is situated at the circumferential position of the catch tooth, the outer link-plate chain link providing a larger engagement space than an inner link-plate chain link. The chain is rejected if an inner link-plate chain link is situated for whatever reason at the position of the catch tooth. It moreover also applies here that the configuration of only one catch tooth per downshift recess formation reduces the number of teeth which are structurally weakened in order for the catching function to be implemented.

The larger sprocket of the sprocket pairing according to one aspect of the disclosure can have only that feature of the upshift recess formation having only exactly one assigned release tooth that relates to the upshift procedure, only that feature of the downshift recess formation having only exactly one assigned catch tooth that relates to the downshift procedure, or particularly advantageously have both features so as to acquire the bicycle chain in an unequivocally directed manner from the smaller sprocket of the pairing as well as to transfer the bicycle chain in an unequivocally directed manner to the smaller sprocket of the pairing.

The fundamental functional assignment of the release tooth to the upshift recess formation with which the release tooth interacts, is typically a spatial assignment, because the bicycle chain when upshifting on the chain roller that in the counterclockwise direction follows the meshing release tooth typically angles towards the smaller sprocket, wherein at least one of the chain links that in the counterclockwise follow the chain link engaging with the release tooth plunges axially into the upshift recess formation. The upshift recess formation is a recess on the end side that points toward the smaller sprocket and creates the axial space for movement of the chain. Therefore, the release tooth in the clockwise direction is preferably contiguous to the upshift recess formation. Therefore, there is preferably no further tooth situated in the clockwise direction between the upshift recess formation and the release tooth.

In the case of the afore-mentioned sprockets having tooth counts of not more than twenty-two it has proven sufficient for the larger sprocket along the entire circumference thereof to have only exactly one upshift region having only one upshift recess formation, and consequently only exactly one release tooth. When an upshift procedure is initiated, the latter takes place within one revolution of the sprocket. This is a latency which is readily accepted by cyclists. As a result of the configuration of only one upshift recess formation and only one release tooth, a smallest possible weakening of the sprocket as a consequence of an upshift procedure takes place.

The statements set forth above in the context of the release tooth apply in analogous manner to the catch tooth. First, the chain, while using the downshift recess formation which is configured as an axial recess in the end side, is moved axially close to the larger sprocket acquiring the chain and then caught by the catch tooth by engaging in a form-fitting manner with a chain-link and directed onto the larger sprocket. Therefore, the functional assignment of the catch tooth to the downshift recess formation thereof is also a spatial assignment. The catch tooth in the counterclockwise direction preferably is directly contiguous to the downshift recess formation. There is therefore preferably no further tooth situated in the counterclockwise direction between the downshift recess formation and the catch tooth.

Having a maximum shift latency of one sprocket revolution, the larger sprocket along the entire circumference thereof can have only exactly one downshift region and consequently only exactly one catch tooth, while weakening to a minimum extent the larger sprocket as a consequence of a downshift procedure.

Tests have demonstrated that there is a positive influence on the wear pattern of the larger sprocket and thus on the entire service life of the latter when the catch tooth, starting from the release tooth, in the clockwise direction has a largest possible spacing from the release tooth. The configuration of only one release tooth and only one catch tooth is also advantageous with a view to achieving this largest possible spacing in the clockwise direction. A large spacing in the clockwise direction while simultaneously adhering to the parameters necessary for shifting between the larger and the smaller sprocket can be maintained in that, starting from the release tooth, a number of k teeth lie between the release tooth and the catch tooth, wherein $k=T-d$, where T is the tooth count of the larger sprocket and where d equals five or equals seven. The release tooth and the catch tooth are not to be included in the count. Only those teeth that in the clockwise direction lie between the release tooth and the catch tooth are counted. When the tooth count T of the larger sprocket is divisible by six into integer numbers without a remainder, d here preferably equals five. When the tooth count T of the larger sprocket is not divisible by six into integer numbers without a remainder, d preferably equals seven. It is however to be pointed out that d can fundamentally also equal seven when the tooth count T of the larger sprocket is divisible by six into integer numbers without a remainder.

Using the same objective of an ideally large spacing in the clockwise direction of the catch tooth from the release tooth of the larger sprocket, the larger sprocket can be configured in such a manner that, starting from the catch tooth, three or five teeth lie in the clockwise direction between the catch tooth and the release tooth, wherein the catch tooth and the release tooth are not to be included in the count.

According to an advantageous but not mandatory refinement, when the tooth count of the larger sprocket is divisible by six into integer numbers without a remainder, three teeth preferably lie in the clockwise direction between the catch tooth and the release tooth, and when the tooth count of the larger sprocket is not divisible by six into integer numbers without a remainder, five teeth preferably lie in the clockwise direction between the catch tooth and the release tooth.

In order to provide the bicycle chain sufficient axial mobility even in the case of a small axial spacing between the smaller and the larger sprocket, the tooth that in the clockwise direction is contiguous to the release tooth can be configured as an upshift mobilizing tooth, the tooth surface thereof that points away from the smaller sprocket lying closer to the smaller sprocket than the tooth surface, pointing away from the smaller sprocket, of the tooth that in the clockwise direction is the next to one tooth after of the mobilizing tooth. This mobilizing tooth, the tooth surface thereof that points toward the smaller sprocket typically not being axially offset in comparison to the next but one tooth following the mobilizing tooth in the clockwise direction, typically engages with an inner link-plate chain link, and when engaging offers the latter an axial clearance for movement towards the smaller sprocket.

Additionally or alternatively, for improving the axial mobility of the chain, the tooth that in the counterclockwise direction is contiguous to the catch tooth can be configured as a downshift mobilizing tooth, the tooth surface of the downshift mobilizing tooth that points away from the smaller sprocket lying closer to the smaller sprocket than the tooth surface, pointing away from the smaller sprocket, of the tooth that in the counterclockwise direction is contiguous to the mobilizing tooth. This mobilizing tooth, the tooth surface thereof that points towards the smaller sprocket typically not being axially offset in comparison to the next but one tooth following the mobilizing tooth in the counterclockwise direction and therefore being thinner than the next but one tooth in the counterclockwise direction, typically engages with an inner link-plate chain link and when engaging offers the latter an axial clearance for movement towards the smaller sprocket.

As a result of the possibility, obtained by the present sprocket pairing, of repositioning the chain in terms of the sequence of the chain link types thereof in a defined manner from the smaller sprocket to the larger sprocket and/or from the larger sprocket to the smaller sprocket, it can be guaranteed that one and the same tooth of at least one sprocket, preferably both sprockets, of the sprocket pairing come to engage in a meshing manner with one and the same type of chain link not only during the sprocket revolutions of an engagement phase, but during all engagement phases between the at least one sprocket and the bicycle chain.

In principle, all teeth of the larger or/and the smaller sprocket of the sprocket pairing can be configured with the same axial thickness in order for the production of the teeth to be simplified. In order for the bicycle chain to be positioned on the sprocket pairing in an ideally exact manner in terms of the chain link sequence relative to the sprocket teeth, the larger sprocket and/or the smaller sprocket, alternating sequentially in the circumferential direction along at least one circumferential portion, can have in each case one axially thinner and one axially thicker tooth. The thickness of the thicker teeth here is advantageously sized in such a manner that the thick teeth do indeed fit into the engagement space of an outer link-plate chain link, but not into the engagement space of an inner link-plate chain link. The thickness of the thinner teeth is advantageously sized in such a manner that the thinner teeth fit into the engagement space of an inner link-plate chain link. As a result, the chain can be guided on the sprocket by way of a very minor axial clearance for movement when the chain engages in an orderly manner in the sprocket, engaging in a meshing manner by way of alternating thicker and thinner teeth.

The present application moreover relates to a bicycle rear-wheel sprocket cassette having a plurality of sprockets which are connected for conjointly rotating in of slip-free manner about the sprocket axis and have in each case a different tooth count. The bicycle rear-wheel sprocket cassette contains at least one bicycle rear-wheel sprocket pairing according to the above description. In order to be able to utilize the advantages of the bicycle rear-wheel sprocket pairing described above to the largest possible extent on the sprocket cassette, the bicycle rear-wheel sprocket cassette preferably has at least three sprockets which have in each case a different tooth count and which form two bicycle rear-wheel sprocket pairings according to the above description, wherein the sprocket having the medium tooth count is the larger sprocket of the one rear-wheel sprocket pairing and the smaller sprocket of the other rear-wheel sprocket pairing.

In this context, all sprockets of the rear-wheel sprocket cassette which have tooth counts of twenty-two or less, are particularly preferably configured as bicycle rear-wheel sprocket pairings according to the above description. Each sprocket here which is not a sprocket on the axial end-side of the sprocket group and has tooth counts of twenty-two or less, is the smaller sprocket of a sprocket pairing and simultaneously the larger sprocket of another sprocket pairing. The smaller sprocket of the sprocket group according to the definition can only be a smaller sprocket of one sprocket pairing.

Because the gear leaps in the case of constant differences in the tooth count ever decrease in increasingly large sprockets, thus sprockets which lie further inward, it is helpful in terms of achieving reasonably uniform gear leaps across the entire sprocket cassette when the difference in the tooth count between adjacent sprockets increases as the tooth count increases. Unavoidable differences in terms of the size of the gear leaps between adjacent sprockets here are to be accepted because the sprockets have only integer tooth counts and differences in the tooth counts between adjacent teeth are likewise integers.

Because the repositioning of the chain between two adjacent sprockets can be carried out in a particularly advantageous manner above all when the tooth counts of the adjacent sprockets have at least a common factor, the rear-wheel sprocket cassette can have a transition sprocket group, comprising a sprocket having 21 teeth, hereunder referred to as the "21-T sprocket", and a smaller 18-T sprocket having 18 teeth which is directly adjacent to the 21-T sprocket. The rear-wheel sprocket cassette preferably has only exactly one odd sprocket. This is preferably the afore-mentioned 21-T sprocket. A sprocket having a number of z teeth hereunder is referred to as a "z-T sprocket" for short.

Because the bicycle rear-wheel sprocket cassette which is explained hereunder and has the above-mentioned transition sprocket group is an extremely advantageously acting bicycle rear-wheel sprocket cassette even without the previously described bicycle rear-wheel sprocket pairing, the present application also relates to a bicycle rear-wheel sprocket cassette having a plurality of sprockets which are connected for conjointly rotating in a slip-free manner about the sprocket axes and have in each case a different tooth count. The sprocket axis defines an axial direction running along the sprocket axis, a radial direction running so as to be orthogonal to the sprocket axis, and a circumferential direction encircling the sprocket axis. The rear-wheel sprocket cassette has a transition sprocket group comprising a 21-T sprocket and a smaller 18-T sprocket which is directly adjacent to the 21-T sprocket. This sprocket cassette can also be refined as explained hereunder.

The issue here is that on the odd 21-T sprocket the assignment of a sprocket tooth to the type of chain link engaged by the former varies in an alternating manner from one revolution to the next during an engagement. As a result, it can arise without any further measures that the chain, depending on the number of revolutions during the chain engagement, in each of the two relative positions which can be differentiated in terms of the sequence of the types of chain links in the chain longitudinal direction, is transferred from the 21-T sprocket to the 18-T sprocket. In contrast, it can be advantageous to transfer the chain to the 18-T sprocket only in one defined alignment in terms of the sequence of the types of chain links, such that there is on the 18-T sprocket a defined assignment of one group of teeth to outer link-plate chain links and of the other group of remaining teeth to the inner link-plate chain links. For example, specifically when the 18-T sprocket is the larger sprocket in a sprocket pairing designed as described above, the correct orientation of the chain on the 18-T sprocket is decisive in terms of the correct orientation of the chain also on the directly adjacent 16-T sprocket. This can continue forever towards smaller sprockets.

A defined transfer of the chain from the 21-T sprocket to the 18-T sprocket in a desired assignment of outer link-plate chain links to teeth on the 18-T sprocket, the teeth being predetermined or/and configured for engaging only with outer link-plate chain links can be achieved in that the 21-T sprocket in the end side thereof that points towards the 18-T sprocket, along a portion of the circumference of the 21-T sprocket has at least two upshift regions having in each case one upshift recess formation. In turn, each upshift region is configured and disposed so as to permit on the transition sprocket group, when the transition sprocket group is viewed axially in a clockwise direction as for reference in a referenced state in which the 18-T sprocket lies closer to the observer than the 21-T sprocket, rotating about the sprocket axis a change of engagement of the bicycle roller chain from the 21-T sprocket to the 18-T sprocket. On the 21-T sprocket, each of the at least two upshift recess formations is in each case assigned only exactly one release tooth which by way of the design and orientation thereof, when interacting with the end-side upshift recess formation assigned thereto during an upshift procedure from the 21-T sprocket to the 18-T sprocket, is configured to be the last tooth that engages between a link plate pair of a chain-link of the bicycle roller chain. An even number of teeth, preferably six teeth, lie between the release teeth of upshift recess formations that are adjacent in the circumferential direction, wherein the release teeth of the adjacent upshift recess formation is not to be included in the count.

The release tooth, when interacting with the upshift recess formation assigned thereto, usually permits an axial mobility of the chain that is sufficient for repositioning the chain from the 21-T sprocket to the 18-T sprocket only when the release tooth, upon initiating a shift procedure by the cyclist, for instance by relocating the chain guide roller of a rear derailleur, engages with an outer link-plate chain link. In the 21-T sprocket, this is the case for one and the same release tooth only in each second revolution of the sprocket.

By providing at least one second release tooth having an even number of intermediate teeth that in the circumferential direction are disposed between the two release teeth, one of the two release teeth engages with one outer link-plate chain link in one and the same revolution of the sprocket, this leading to advantageously short latencies.

It furthermore applies here too that by configuring only one release tooth per upshift recess formation, this in comparison to the remaining teeth which are not a release tooth usually representing a structural weakening of the strength of the release tooth in comparison to other teeth, the weakening of the 21-T sprocket can be restricted to a minimum possible extent.

Additionally or alternatively, the 21-T sprocket in the end side that points towards the 18-T sprocket, along the circumference of the 21-T sprocket, can have at least two downshift regions having in each case one downshift recess formation. In turn, each downshift region, when axially viewing the transition sprocket group in the referenced state, is configured so as to permit on the transition sprocket group rotating in the clockwise direction about the sprocket axis a change of engagement of the bicycle roller chain from the 18-T sprocket to the 21-T sprocket. Each downshift recess formation on the 21-T sprocket is in each case advantageously assigned only exactly one catch tooth which by way of the design and orientation thereof, when interacting with the end-side downshift recess formation assigned thereto during a downshift procedure from the 18-T sprocket to the 21-T sprocket is configured to be the first tooth that engages between link plates of a chain link of the bicycle roller chain.

A bicycle chain which engages on the 18-T sprocket by way of a defined assignment of the different types of chain links of the bicycle chain to the teeth on the even 18-T sprocket can thus be repositioned from the 18-T sprocket to the 21-T sprocket while taking into account the defined assignment. In order to achieve short latencies, an even number of teeth lie between the catch teeth of downshift recess formations that are adjacent in the circumferential direction, wherein the catch teeth of the adjacent downshift recess formations are not to be included in the count.

It applies here too that a catch tooth on the 21-T sprocket, when interacting with the downshift recess formation assigned thereto, can engage in a bicycle chain which for catching has been moved axially sufficiently close to the 21-T sprocket only when the catch tooth can engage in an outer link-plate chain link. By virtue of the arrangement described above, this is always the case for one of the two catch teeth.

As a result of each downshift recess formation being assigned only one catch tooth, as above in the case of the release tooth, the sprocket in the region of the downshift recess formation is locally weakened only to the extent necessary. The latency is indeed increased as a result of the further catch tooth or release tooth, respectively, which is disposed so as to be remote from the first catch tooth or release tooth, respectively, but the weakening of the sprocket is locally restricted as a result of the configuration of the catch tooth or the release tooth, respectively, and distributed to circumferential locations that are disposed so as to be mutually spaced apart. The wear resistance of the entire sprocket is thus increased. As an overall result, the slightly increased shift latency is overcompensated for by the increased wear resistance.

Even shorter shift latencies can be obtained when the 21-T sprocket has exactly three upshift regions having in each case one upshift recess formation and, in each case, exactly one release tooth, wherein an even number of, preferably six, teeth lie between the release teeth of upshift recess formations that are adjacent in the circumferential direction. The release teeth of the adjacent upshift recess formations are not to be included in the count. Additionally or alternatively, the 21-T sprocket has exactly three downshift regions having in each case one downshift recess formation and in each case exactly one catch tooth, wherein an even number of, preferably six, teeth lie in each case between the catch teeth of downshift recess formations that are adjacent in the circumferential direction. The catch teeth of the adjacent downshift recess formations are not to be included in the count.

In order for the wear resistance to be increased, the catch teeth are preferably distributed so as to be equidistant on the circumference of the 21-T sprocket or/and the release teeth are distributed so as to be equidistant on the circumference of the 21-T sprocket.

A particularly advantageous synergetic effect is obtained by disposing a catch tooth as a directly adjacent tooth of a release tooth. The catch tooth is preferably adjacent to the release tooth in the clockwise direction. Because only exactly one catch tooth can at all times actually catch the chain in one sprocket revolution, each tooth which in terms of the physical design embodiment thereof corresponds to the actual catching tooth is considered to be a catch tooth. The catch tooth is not only configured so as to be thinner than a regular tooth, as has already been described above, but the tooth surface of the catch tooth that faces away from the smaller sprocket is closer to the smaller sprocket in comparison to regular teeth of the 21-T sprocket. Such a catch tooth which in the clockwise direction is adjacent to the release tooth can thus serve as an upshift mobilizing tooth described above, the latter offering the chain an axial space for movement and thus facilitating a relocation onto the 18-T sprocket.

Consequently, the release tooth which in the counter-clockwise direction is adjacent to the catch tooth and by virtue of the function of the release tooth is likewise thinner than a regular tooth of the 21-T sprocket, the tooth surface of the release tooth that faces away from the smaller sprocket being closer to the smaller sprocket in comparison to a regular tooth of the 21-T sprocket, can likewise serve the release tooth as a downshift mobility tooth which permits the inner link-plate chain link that in the counterclockwise direction follows the outer link-plate chain link engaged by the release tooth spatial proximity to the smaller 18-T sprocket, on the one hand, and can engage in a meshing manner in the smaller engagement space of the inner link-plate chain link, on the other hand.

Such an arrangement of a pair composed of a release tooth and a catch tooth that in the clockwise direction is directly adjacent to the release tooth ensures a particularly defined shift behaviour from the 18-T sprocket to the 21-T sprocket as well as in the opposite shifting direction. More than one pair composed of such a release tooth and a catch tooth that in the clockwise direction is adjacent to the release tooth are preferably disposed on the 21-T sprocket. For example, two or three such pairs can be disposed on the 21-T sprocket.

The release tooth as well as the catch tooth that in the clockwise direction is directly adjacent thereto are preferably provided with a ramp on that side of the teeth that faces away from the 18-T sprocket and the teeth being configured as mutual mobilizing teeth, whereby a chain link is able to be supported on the ramp by way of a radial bearing engagement. The ramp has a ramp surface which points radially outward and is preferably formed by a stepped configuration of the release tooth and of the catch tooth. For achieving the stepped configuration, a portion of the release tooth and of the catch tooth that lies radially further outside can be configured so as to be thinner than a portion of the release tooth or of the catch tooth, respectively, that lies radially further inward. The ramp surface, the axial dimension thereof being preferably at least 50% of the thickness of an outer link plate of the bicycle chain interacting with the sprocket, or the sprocket cassette, respectively, so as to offer the chain a sufficient supporting surface, can be inclined towards the next larger sprocket that is adjacent to the 21-T sprocket, wherein the radial component of the normal vector of the ramp surface is greater than an axial component thereof. An opposite inclination of the ramp surface towards the 18-T sprocket is fundamentally possible but not preferable because the ramp surface in this instance, conjointly with the tooth surface that faces away from the 18-T sprocket, could form a V-groove in which dirt accumulates.

The ramp surface can be a flat surface. In order to achieve an ideally large bearing surface of a chain link on the ramp surface, and thus an ideally reliable support of the chain on the radial outside of the ramp, the ramp surface at least in portions can be configured so as to be complimentary to a radially inward-pointing periphery of the chain link plates, in particular of the inner link plates, of the revolving bicycle chain.

In order to provide transmission conditions which enable a high torque on the rear wheel, thus to transmit the rotation of the chain ring on the foot pedal for strength rather than speed, the transition sprocket group additionally preferably has a 24-T sprocket, wherein the 21-T sprocket is disposed axially between the 24-T sprocket and the 18-T sprocket.

In order for the bicycle chain to be acquired from the 21-T sprocket to the 24-T sprocket in an advantageously defined manner in terms of the chain link sequence such that predetermined teeth of the 24-T sprocket are reliably transferred to outer link-plate chain links for engaging in a meshing manner with the latter, the 24-T sprocket in the end side thereof that points towards the 21-T sprocket, along the circumference of the 24-T sprocket can have at least two downshift regions having in each case one downshift recess formation.

Only exactly one catch tooth is in each case assigned on the 24-T sprocket of each downshift recess formation, the catch tooth by way of the design and orientation thereof when interacting with the end-side downshift recess formation assigned thereto during a downshift procedure from the 21-T sprocket to the 24-T sprocket is configured to be the first tooth which engages between link plates of a chain link of the bicycle roller chain. The chain link of the bicycle roller chain that comes to engage with the catch tooth is typically an outer link-plate chain link because the latter, when interacting with the downshift recess formation, can be moved axially further into the engagement region of the catch tooth than an inner link-plate chain link.

An odd number of teeth lie between the catch teeth of downshift recess formations that are adjacent in the circumferential direction, wherein the catch teeth of the adjacent downshift recess formations are not to be included in the count such that, independently of the relative alignment in which the chain departs from the 21-T sprocket, one catch tooth reliably comes to engage with an outer link-plate chain link within one rotation of the 24-T sprocket. This leads to advantageously short shift latencies, simultaneously associated with a minor structural weakening of the 24-T sprocket.

Additionally or alternatively, the 24-T sprocket in the end side thereof pointing towards the 21-T sprocket, along a portion of the circumference of the 24-T sprocket can have at least two upshift regions having in each case one upshift recess formation.

In order for the wear resistance of the 24-T sprocket to be increased, each of the two upshift recess formations of the latter are in each case assigned only exactly one release tooth which, by way of the design and orientation thereof when interacting with the end-side upshift recess formation assigned thereto during an upshift procedure from the 24-T sprocket to the 21-T sprocket, is configured to be the last tooth that engages between a link plate pair of a chain link of the bicycle roller chain.

In order for shorter shift latencies to be achieved when upshifting, an uneven number of teeth preferably lie on the 24-T sprocket between the release teeth that are adjacent in the circumferential direction. The release teeth of the adjacent upshift recess formations are not to be included in the count here.

Even shorter shift latencies can be obtained in that the 24-T sprocket has exactly three upshift regions having in each case one upshift recess formation and, in each case, exactly one release tooth. For uniformly distributing the latencies along the sprocket circumference an odd number of, preferably seven, teeth lie between the release teeth of upshift recess formations that are adjacent in the circumferential direction. The release teeth of the adjacent upshift recess formations are not to be included in the count. Additionally or alternatively, the 24-T sprocket has exactly three downshift regions having in each case one downshift recess formation and, in each case, exactly one catch tooth.

An odd number of, preferably seven, teeth lie in each case between the catch teeth of downshift recess formations that are adjacent in the circumferential direction. The catch teeth of the adjacent downshift recess formations are not to be included in the count.

In order to achieve an unequivocal assignment of sprocket teeth to the types of chain links that are engaged by the sprocket teeth on ideally many sprockets, the bicycle rear-wheel sprocket cassette has as many even sprockets as possible. Therefore, the sprocket cassette preferably comprises a first set of directly axially adjacent sprockets of different sizes, the difference in the tooth count there between being in each case two teeth. These teeth are preferably configured having orientation formations which permit the sprocket to engage with the chain only in a predetermined orientation of the chain link sequence relative to the sprockets. Such orientation formations can comprise at least one above-described thicker tooth which in the circumferential direction is disposed between two thinner teeth and permits an engagement only with an outer link-plate chain link.

At least one sprocket preferably adjoins this first set, the sprocket in terms of the difference in the tooth count differing from the larger sprocket of the first set by three teeth. In order for the bicycle rear-wheel sprocket cassette to have only a minor number of odd sprockets, the cassette preferably comprises a second set of sprockets of different sizes, axially adjacent sprockets there two having in each case a difference in the tooth count of three teeth. This second set preferably contains an even number of sprockets, preferably two sprockets. Even sprockets of this second set in turn are preferably configured having the above-mentioned orientation formations which permit the sprocket to engage with the chain only in a predetermined orientation of the chain link sequence relative to the sprockets.

A third set of even sprockets of different sizes can adjoin the second set, the smallest sprocket in comparison to the second set, and the axially adjacent sprocket of the third set among one another, in terms of the difference in the tooth count differing in each case by four teeth. In turn, each sprocket of the third set preferably has above-mentioned orientation means for the relative alignment of the chain in terms of the chain link sequence of the latter in relation to the sprockets.

A particularly preferred bicycle rear-wheel sprocket cassette corresponding to the above criteria is a twelvefold sprocket cassette having the following tooth count increments: 10-12-16-18-21-24-28-32-38-44-52. For the above-mentioned reasons, preferably all sprocket pairings having tooth counts of less than twenty-one here are configured as above-described rear-wheel sprocket pairings.

The ramp surface described in the context of the 21-T sprocket can also be configured on the sprockets of the sprocket cassette having tooth counts of more than twenty-one, for instance on the sprockets which lie between the chain line and the bicycle longitudinal central plane orthogonal to the sprocket axis. The above description of the ramp surface also applies to the ramp surfaces which are preferably configured on the sprockets having tooth counts of more than twenty-one. The ramp surface extends across at least, preferably exactly, two adjacent teeth and forms a radial and axial stage on the side of a sprocket that faces away from the next smaller sprocket. The two adjacent teeth across which the ramp surface extends on the sprockets having tooth counts of more than twenty-one are typically not a pair composed of the release tooth and a catch tooth that is directly adjacent to the release tooth. The configuration preferably takes place on at least one mobilizing tooth. The catch tooth or release tooth respectively, that is adjacent to a mobilizing tooth provided with a ramp can likewise have a ramp. The ramp of a catch tooth or/and of a release tooth preferably lies radially further outside than the ramp of a mobilizing tooth that is directly adjacent to the catch tooth or the release tooth, respectively. The largest sprocket, on the side thereof that faces away from the next smaller sprocket, can also have a ramp surface, or have a plurality of ramp surfaces that are distributed along the circumference of the largest sprocket.

As described above, the ramp surfaces in the case of larger sprockets can support the chain radially outside on the ramp surface by way of chain link plates engaging therein in a bearing manner, and thus prevent the bicycle chain being undesirably repositioned to the next smaller sprocket while pedaling backwards and utilizing the usual freewheeling mechanism of the sprocket cassette. As the tooth count increases, the sprockets move increasingly further from the chain line such that an increasingly oblique positioning of the bicycle chain relative to the bicycle longitudinal central plane orthogonal to the sprocket axis arises as the sprockets increase in size. When pedaling backwards on the larger sprockets, the latter thus lying closer to the bicycle longitudinal central plane, this oblique running of the chain can lead to an undesirable shift movement of the chain towards the next smaller sprocket and thus to less oblique running. The ramp surface can counteract this.

On smaller sprockets having tooth counts of twenty-two teeth and less, shift-assisting ramps can be configured on that side on the teeth surfaces that points toward the next smaller sprocket. Because these sprockets typically lie axially outside the chain line, individual chain links by way of the oblique running of the chain, or the oblique tension acting on the chain, respectively, can be kept in a stable manner on the ramps on the tooth surface that points towards the outside.

Radially inward peripheries of inner link-plate chain links that point towards the sprocket axis are preferably supported on ramps of this type. The ramps have a support surface that points radially outward. When interacting with a tooth head of an axially adjacent smaller sprocket, the tooth head being adjacent to a ramp so as to be axially spaced apart therefrom, both inner link plates of one and the same inner link-plate chain link can be physically supported radially on the inside when shifting the chain between the smaller sprocket and the larger sprocket that on the side thereof that faces the smaller sprocket supports the ramp. The inner link plate which axially lies further inward can be supported by the ramp, and the inner link plate which axially lies further outward can be supported by the tooth head, in particular by a surface of the tooth head that points radially towards the outside. The supporting action can take place when downshifting as well as when upshifting.

It is however also conceivable that only the inner link plate which axially lies further inward during a shift procedure is supported on a ramp on that side of a sprocket, in particular on a tooth surface, that points towards the smaller sprocket.

The present application also relates to a bicycle drive assembly comprising a bicycle rear-wheel sprocket pairing as described above, or/and a bicycle rear-wheel sprocket cassette as described above, having a bicycle roller chain which is configured for engaging in a meshing, force-transmitting manner with the sprockets of the bicycle rear-wheel sprocket pairing, or the bicycle rear-wheel sprocket cassette, respectively. The bicycle roller chain has a plurality of chain rollers which are mutually successive at a pitch spacing and are connected to one another by pairs of parallel link plates. The bicycle roller chain in the chain revolving direction has inner link plate pairs having a smaller link plate spacing alternating sequentially with outer link plate pairs having a larger link plate spacing.

The bicycle drive assembly can have a single chain ring in the region of the foot pedals such that any change in a transmission ratio from the front chain ring to the rear sprocket cassette takes place only by changing the engagement of the chain with one of the sprockets of the sprocket cassette.

Preferred for engaging with the above preferred twelve-fold sprocket cassette is a bicycle chain, the chain link plates thereof on the radially outer periphery having a rectilinear peripheral portion between the two chain roller axes connected by a chain link plate, and the chain link plates thereof on the radially inner periphery having a curved peripheral line in such a manner that the link plate height, to be measured orthogonally to the chain roller axis and orthogonally to the chain revolving direction, in a region between the chain roller axes is less than in the region of the chain roller axes. A narrow bicycle chain which nevertheless has a sufficient tensile strength is thus obtained.

In order to achieve a rapid precise shift procedure having a minor play in the axial movement of the bicycle chain in a repositioning portion between the current chain-guiding sprocket and the future chain-guiding sprocket it applies preferably to at least one bicycle rear-wheel sprocket pairing, more preferably to a plurality of bicycle rear wheel sprocket pairings, that in a shift procedure in which the bicycle roller chain is repositioned from one sprocket to a sprocket axially adjacent thereto, exactly one inner link-plate chain link in the repositioning portion is situated between the last chain link which engages with the still chain-guiding sprocket and the first chain link which comes to engage, or engages, with the future chain-guiding sprocket. Preferably only exactly one inner link-plate chain link is situated in the repositioning portion. While it is not to be precluded that this repositioning state may also apply to sprocket pairings having a tooth spacing of more than two teeth between the larger sprocket and the smaller sprocket, the repositioning state applies in particular to sprockets having a difference of two teeth in the tooth count.

In FIG. 1, one embodiment of a bicycle rear-wheel sprocket cassette having twelve sprockets which for conjointly rotating about the sprocket axis R, the latter being orthogonal to the drawing plane of FIG. 1, are connected to one another in a coaxial, slip-free manner is generally identified by the reference sign 1.

The view of the sprocket cassette 1 in FIG. 1 corresponds to the reference view described above in the introduction to the description, that is to say to the viewing direction along the sprocket axis R. The smallest sprocket lies closest to the observer of FIG. 1, and the largest sprocket lies so as to be most remote from the observer of FIG. 1.

The tooth count increments of the sprocket cassette 1 of FIG. 1 are: 10-12-14-16-18-21-24-28-32-38-44-52. The sprocket cassette 1 thus comprises a smallest sprocket 10 having ten teeth, axially adjacent thereto a sprocket 12 having twelve teeth, a next larger sprocket 14 having fourteen teeth, an in turn next larger sprocket 16 having sixteen teeth, and axially adjacent thereto a sprocket 18 having eighteen teeth.

The next larger sprocket 20 adjacent to the sprocket 18 is a transition sprocket having twenty-one teeth. Contiguous thereto is a sprocket 22 having twenty-four teeth, a sprocket 24 having twenty-eight teeth, a sprocket 26 having thirty-two teeth, a sprocket 28 having thirty-eight teeth, a sprocket 30 having forty-four teeth, and finally a sprocket 32 as the largest sprocket having fifty-two teeth.

Of these sprockets 10 to 32, the directly adjacent sprocket pairings of the sprockets 10 to 18 form in each case one bicycle rear-wheel sprocket pairing according to the disclosure as described above.

The sprockets 12 to 16 here are in each case sprockets of two sprocket pairings, one being the smaller sprocket of the sprocket pairing and once being the larger sprocket of the sprocket pairing. To this end, the sprockets 10 and 12 form a bicycle rear-wheel sprocket pairing 11, the sprockets 12 and 14 form a bicycle rear wheel sprocket pairing 13, the sprockets 14 and 16 form a bicycle rear-wheel sprocket pairing 15, and the sprockets 16 and 18 form a bicycle rear wheel sprocket pairing 17.

The two sprockets 18 and 22, which in the sprocket cassette 1 are axially adjacent to the single odd transition sprocket 20, conjointly with the transition sprocket 20 form a transition sprocket group 19.

In order to facilitate shift procedures between axially adjacent sprockets, the sprockets with the exception of the smallest sprocket 10 have in each case at least one upshift region 34 having an upshift recess formation 36 and a release tooth 38 and have in each case at least one downshift region 40 having a downshift recess formation 42 and a catch tooth 44.

For the sake of improved clarity, in FIG. 1 only the largest sprocket 32 having 52 teeth for the upshift region 34 having the upshift recess formation 36 and the release tooth 38 as well as for the downshift region 40 having the downshift recess formation 42 and the catch tooth 44 is provided with the reference sign.

The regions referred to as the upshift region 34 and the downshift region 40 relate at all times to the sprocket on which the regions are configured. This means that the upshift region 34 facilitates a bicycle chain being repositioned from the sprocket that supports the upshift region 34 to the axially adjacent next smaller sprocket, and the downshift region 40 facilitates the bicycle chain being relocated from the next smaller sprocket to the sprocket that supports the downshift region 40.

The recess formations 36 and 42 permit the bicycle chain to be moved axially close to the sprocket that supports the respective recess formations because the outer link plates can in particular plunge into the recess formations designed as axial recesses on the end side. In the absence of recess formations being configured at the mentioned locations, the outer link plates of the bicycle chain would collide with the end face of the sprocket which would delimit the bicycle chain being moved axially closer to the end side that has the recess formations.

The recess formations 36 and 42 can have a plurality of different facets which in terms of the sprocket axis R can have different mutual positions or/and have a different inclination. As a result, it can be achieved that the bicycle chain can plunge into the recess formations 36 or 42 only by way of a predetermined relative position in terms of the outer link plates and inner link plates of the bicycle chain, and in a relative position in which the bicycle chain is offset by one chain pitch in the chain revolving direction is axially rejected by a facet. The facet can be configured in such a manner that the facet can invade the intermediate space between two outer link plates which are successive in the chain revolving direction, the invasion taking place towards an inner link plate which lies between the outer link plates, but axially physically rejects an outer link plate which lies between two inner link plates from the sprocket supporting the outer link plate.

Catch teeth 44 of the individual sprockets of the rear-wheel cassette 1, when the rear-wheel cassette 1 is viewed as for reference, lie on a helix 45 which rotates radially outward in the counterclockwise direction.

Figure 1B:
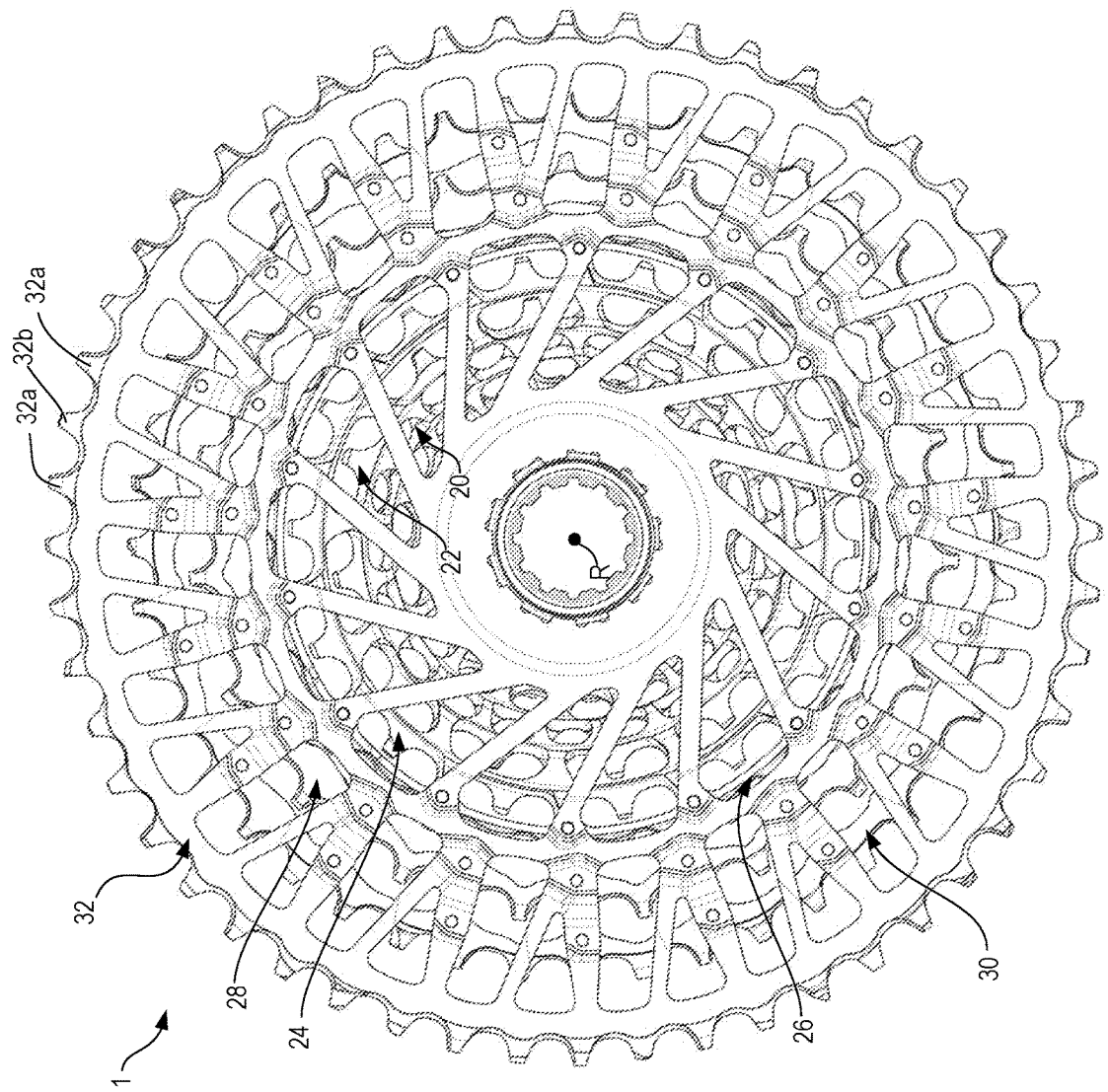
FIG. 1B shows the sprocket cassette of FIG. 1 with the opposite viewing direction, away from the longitudinal central plane.
Figure 1A:
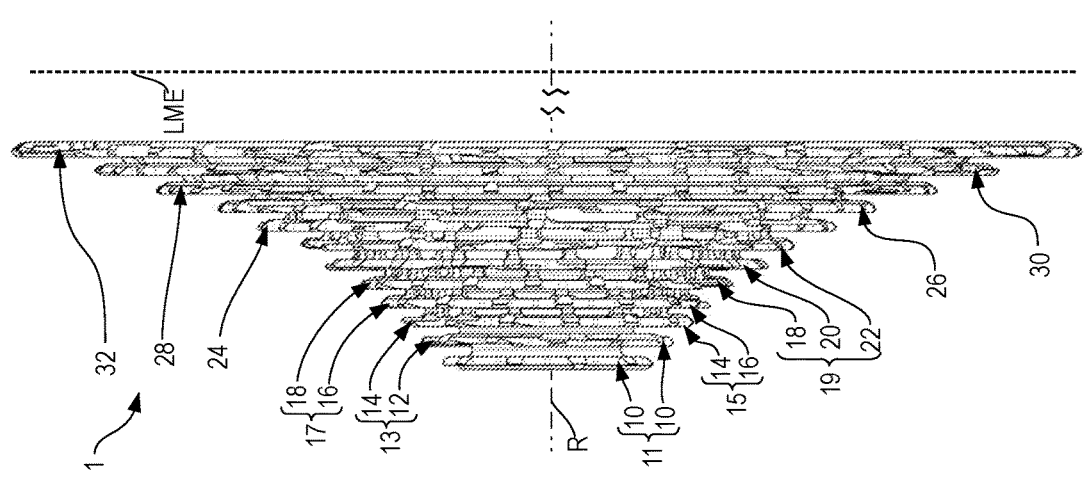
FIG. 1A shows the sprocket cassette of FIG. 1 with the viewing direction being orthogonal to the sprocket axis.

The sprocket cassette 1 in FIG. 1A is illustrated with the viewing direction being orthogonal to the sprocket axis R. For the purpose of explanation, the sprocket axis R, which has already been mentioned above and is orthogonal to the longitudinal central plane LME of the bicycle supporting the sprocket cassette 1, is illustrated by dashed lines. The actual spacing between the longitudinal central plane LME and the sprocket cassette 1 is larger than in the shortened illustration of FIG. 1A.

The sprockets 10 to 30 are preferably configured integrally as a so-called sprocket dome, for example by being subtractive machined from a solid material. Deviating herefrom, the two smallest sprockets 10 and 12 can alternatively be configured as individual sprockets. The two smallest sprockets 10 and 12 in this instance can be connected to the sprocket dome of the sprockets 14 to 30 by way of a slotted nut. The largest sprocket 32 is configured as an individual sprocket. The sprocket dome for transmitting torque can be connected to the stays of the sprocket 32 in a manner known per se, using pins or rivets, or be connected thereto in a materially integral manner.

The axial spacing between the mutually directly adjacent sprockets is typically smaller than the tooth height of a regularly shaped tooth of the sprockets. The minor axial spacing between the individual sprockets requires a very narrow chain and an extremely precise design of the toothed circumferential regions of the individual sprockets.

FIG. 1B shows the sprocket cassette 1 from the inside, thus when viewed from the longitudinal central plane LME along the sprocket axis R. To the extent that the smaller sprockets can be seen through the passages formed by the stays of the larger sprocket 32, the smaller sprockets are identified by reference signs. In order for the largest sprocket to be further described, reference otherwise is made to the explanations hereunder pertaining to FIGS. 10 to 10B.

Figure 2B:
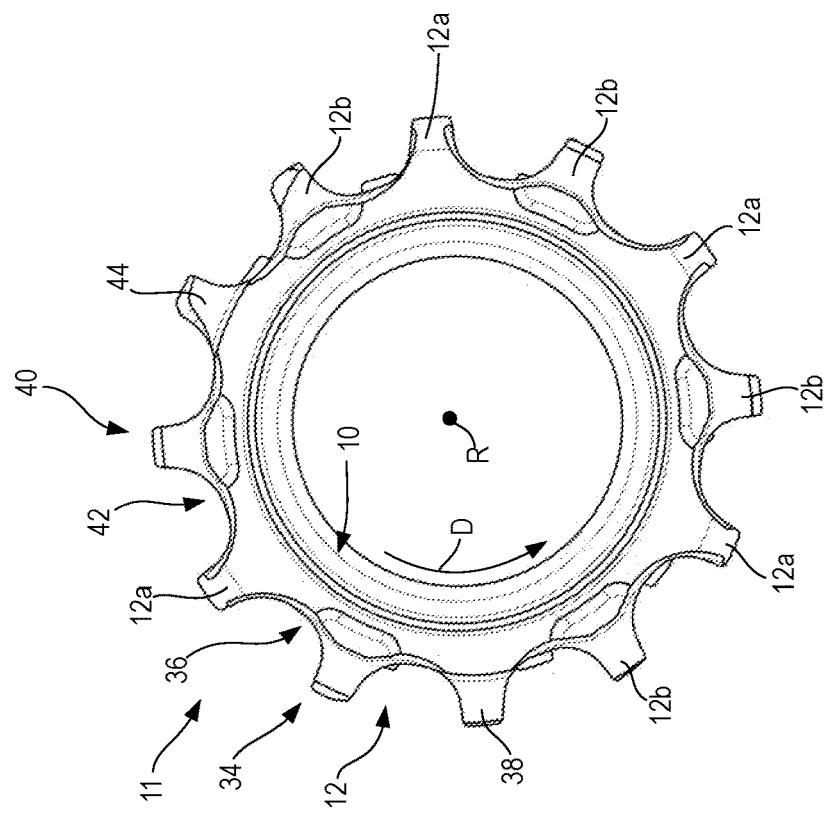
FIG. 2B shows the bicycle rear-wheel sprocket pairing of FIG. 2A when viewed in the opposite direction.
Figure 2A:
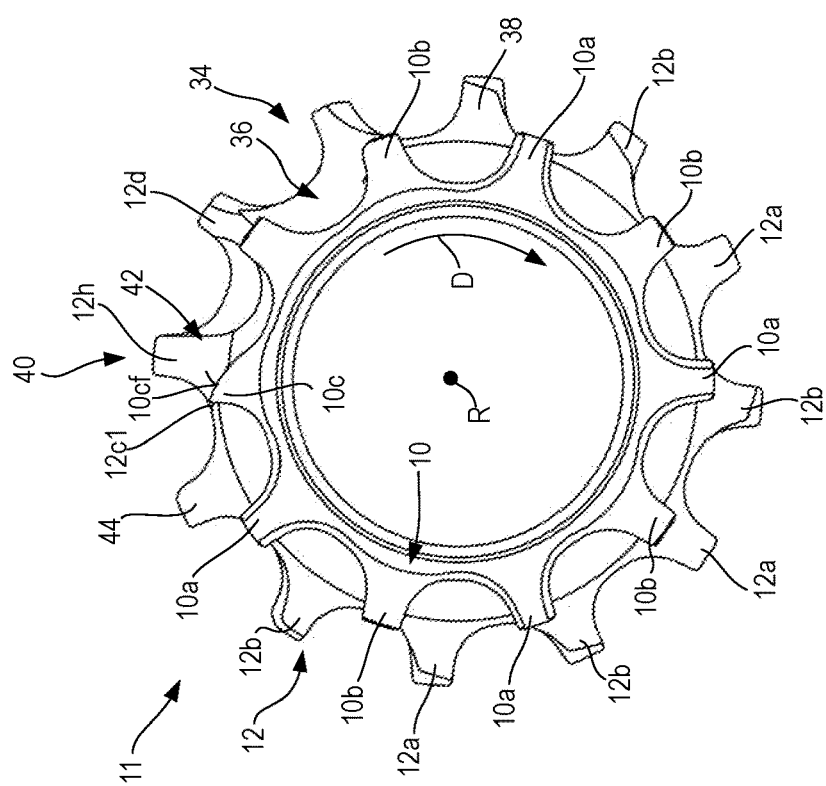
FIG. 2A shows a first bicycle rear-wheel sprocket pairing according to the embodiment of the sprocket cassette of FIGS. 1 to 1B, having a smaller sprocket having 10 teeth and a larger sprocket having 12 teeth, as viewed for reference.

FIG. 2A shows the smallest bicycle rear wheel sprocket pairing 11 of the sprocket cassette 1 as viewed for reference. FIG. 2B shows the same bicycle rear wheel sprocket pairing 11 when viewed axially but "from the inside", thus in such a manner that the larger sprocket 12 lies closer to the observer of FIG. 2B than the smaller sprocket 10.

The smaller sprocket 10 is preferably configured as a synchronizing sprocket having thicker teeth 10*a* and thinner teeth 10*b*. The axial thickness of the thicker teeth 10*a* here is chosen in such a manner that the thicker teeth 10*a* fit only into the engagement space of an outer link-plate chain link but are however thicker than the spacing between two parallel inner link plates of an inner link-plate chain link. Therefore, a bicycle chain in terms of the alternating types of chain links successive in the chain revolving direction can mesh with the sprocket 10 only in exactly one relative alignment, specifically when the thicker teeth 10*a* are assigned outer link-plate chain links. Because of the even number of chain links in one bicycle chain revolution, and because of the even number of teeth of the sprocket 10, an assignment of a tooth to one type of chain link, once established, is maintained throughout all sprocket revolutions during the entire duration of the engagement of the sprocket 10 with the chain.

A tooth 10*c* of the smallest sprocket 10 has a rounded and thus radially shortened tooth tip, so as to facilitate the bicycle chain being repositioned from the sprocket 10 to the axially adjacent next larger sprocket 12 and to avoid any collision between the chain and the tooth 10*c*.

Exactly one upshift region 34 having exactly one upshift recess formation 36 and exactly one release tooth 38 is configured on the larger sprocket 12 of the sprocket pairing 11, the release tooth 38 in the clockwise direction being directly adjacent to the upshift recess formation 36. The release tooth 38 in the clockwise direction is the first tooth which on the tooth surface thereof that points towards the smaller sprocket 10 is not modified by the upshift recess formation 36. The release tooth 38 in the clockwise direction is thus the first tooth to which the upshift recess formation 36 no longer extends.

Moreover, exactly one downshift region 40 is configured on the larger sprocket 12, the downshift region 40 in the counterclockwise direction having a shorter spacing from the upshift region 34 than in the clockwise direction. The only downshift recess deformation 42 in the counterclockwise direction no longer extends to the single catch tooth 38, the latter consequently being the first tooth that in terms of the design thereof is not modified by the downshift recess formation 42 and in the counterclockwise manner is contiguous to the downshift recess formation 42.

The arrow D running in the circumferential direction indicates the rotating direction of the drive of the sprocket pairing 11 in the drive operation on the bicycle 70 shown in FIG. 11.

As can be seen from the rear view of the sprocket 12 of FIG. 2B, the sprocket 12 also has thicker teeth 12*a* and thinner teeth 12*b* of which the thicker teeth 12*a*, by virtue of the dimension of the thickness thereof, can engage in a meshing manner only in outer link-plate chain links. The spacing of two parallel inner link plates of an inner link-plate chain link is smaller than the thickness of the teeth 12*a*. Consequently, the bicycle chain can revolve also on the larger sprocket 12 only in a specific relative position, specifically when the teeth 12*a* are in each case assigned one outer link-plate chain link.

By using only one release tooth 38 and only one catch tooth 44, a directed transfer of the bicycle chain can take place in a reliable manner by way of the relative position between the sprockets 10 and 12 required for engaging in a meshing manner with the respective sprocket 10 or 12. Only exactly one tooth here is to be weakened for each shifting direction, this resulting overall in a wear-resistant larger sprocket 12.

The disposal of the catch tooth 44 and of the release tooth 38 along the circumference of the larger sprocket 12 in the form shown has a further wear-diminishing effect on the second smallest sprocket 12 of the cassette 1, because the upshift region 34 and the downshift region 40 transition into one another, this meaning weakening of a very minor number of teeth as a result of the recess formations 36 and 42. Many teeth can thus be configured having ideally large load-bearing flanks, this imparting to the teeth a positive load-bearing capability. The susceptibility to wear of the sprocket 12 decreases as the load-bearing capability of the sprocket increases. Starting from the catch tooth 44 in the clockwise direction, three teeth of the larger sprocket 12 of the sprocket pairing 11 lie between the catch tooth 44 and the release tooth 38 in the exemplary embodiment illustrated.

Starting from the release tooth 38, seven teeth of the larger sprocket 12 lie between the release tooth 38 and the catch tooth 44, this corresponding to the tooth count of the sprocket 12 minus 5. It has been specifically demonstrated that, Starting from the release tooth 38, an ideally large spacing of the catch tooth 44 from the release tooth 38 in the clockwise direction leads to an advantageous wear pattern of the sprocket 12 when in operation, in particular when the bicycle equipped with the sprocket cassette 1 is driven so as to be assisted by an electric motor and thus a higher torque is transmitted to the smaller sprockets of the sprocket cassette 1 as compared when driven by pure muscular force. These smaller sprockets in the example illustrated are the sprockets 10 to 18.

A deflection surface 12d, which is part of the downshift recess formation 42 as well as part of the upshift recess formation 36, is configured on the central tooth of the three teeth that in the clockwise direction lie between the catch tooth 44 and the release tooth 38. The deflection surface 12d which is recessed in relation to the end face of the sprocket 12 but is elevated and projects axially in relation of the recess portion of the deflection surface 12d that is adjacent to the latter in the circumferential direction is configured for engaging in the intermediate space between two outer link plates. Should no inner link plate but an outer link plate lie for whatever reason at the location of the deflection surface 12d in the shift procedure, the chain as a result of the outer link plate bearing on the deflection surface 12d is physically prevented from moving axially closer to the end face of the sprocket 12, this being necessary for repositioning, and the chain is thus rejected.

When downshifting the chain from the sprocket 10 to the sprocket 12, a radially inward-pointing periphery 54c (see FIG. 8) of an internal link plate of an inner link-plate chain link 54 (see FIG. 8) can be physically supported on a radially outward-facing head surface 10cf of the tooth 10c. The inner periphery 54c is shaped so as to be concave between the chain roller axes 55 (see FIG. 8). With a view to an ideally planar and reliable support, the head surface 10cf is therefore shaped so as to be convex, wherein the leading end of the head surface 10cf in the rotating direction of the drive D lies radially further inside than the trailing end of the head surface 10cf. The convex design of the head surface 10cf is preferably configured so as to be complimentary to the concave inner periphery 54c of the chain 50.

The sprocket pairing 11 here has a particularity: the tooth of the sprocket 12 that in the reference view lies behind the tooth 10c, on the tooth surface of the tooth that points towards the smaller sprocket 10, has a deflection surface 12h which is part of the downshift recess 42 of the downshift region 40. On this defection surface 12h, an inner link-plate chain link, on that side of the sprocket 12 that faces the smaller sprocket 10, can move past towards the catch tooth 44 of the sprocket 12, but an outer link-plate chain link cannot.

The deflection surface 12h terminates radially inwardly at a ramp 12c1 which has a radially outward-pointing support surface which is preferably likewise convexly curved and projects axially in relation to the deflection surface 12h.

When downshifting from the sprocket 10 to the sprocket 12, an inner link-plate chain link by way of the two inner link plates thereof can therefore be supported on the sprocket pairing, specifically on the head surface 10cf by way of the inner link plate that lies axially further outside, and on the ramp 12c1 by way of the inner link plate that lies further inside. The chain can thus be positively guided in the transfer portion. The oblique running of the chain when the chain engages with the sprockets 10 and 12 that lie axially outside the chain line supports the bearing action of the inner link plate on the deflection surface 12h and on the ramp 12c1, because the oblique running of the chain on sprockets that lie outside the chain line causes a force which acts radially axially inwards on the engaging sprocket.

Figure 3B:
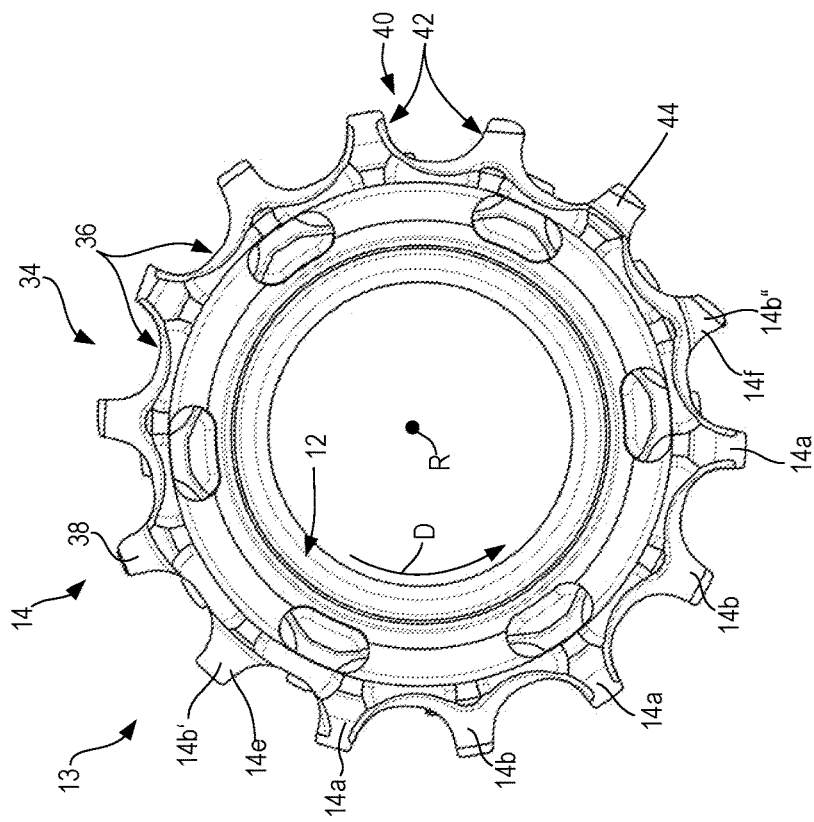
FIG. 3B shows the bicycle rear-wheel sprocket pairing of FIG. 3A when viewed in the opposite direction.
Figure 3A:
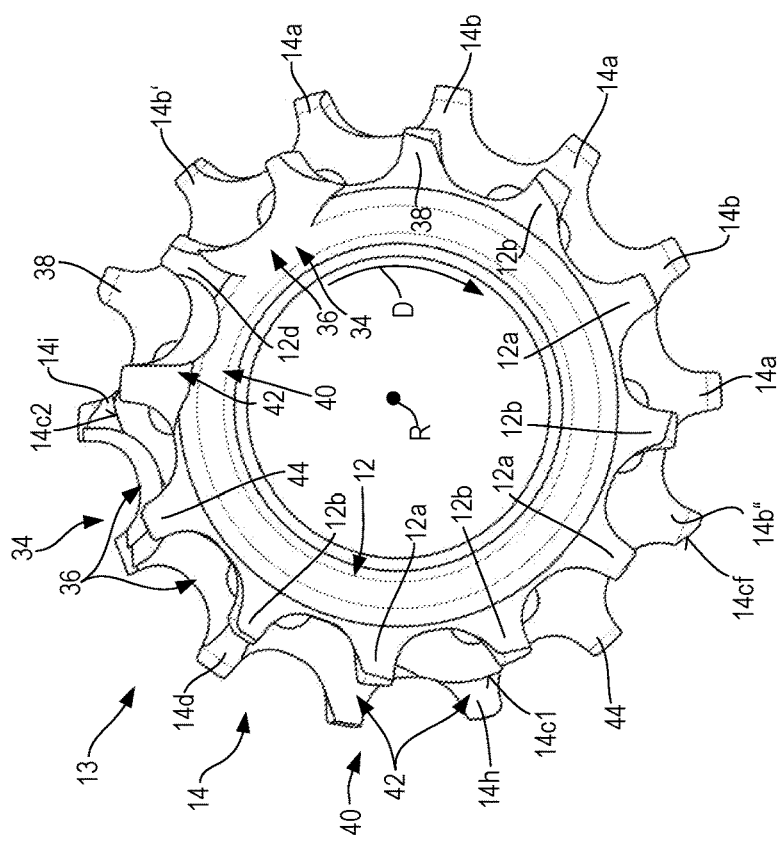
FIG. 3A shows a second bicycle rear-wheel sprocket pairing according to the embodiment of the sprocket cassette of FIGS. 1 to 1B, having a smaller sprocket having 12 teeth and a larger sprocket having 14 teeth, as viewed for reference.

FIGS. 3A and 3B show the bicycle rear-wheel sprocket pairing 13 having the sprocket 12 already known from FIGS. 2A and 2B, the latter this time being the smaller sprocket of the pairing 13, and having the sprocket 14 as the larger sprocket. FIG. 3A shows the bicycle rear-wheel sprocket pairing 13 as viewed for reference from the outside; FIG. 3B shows the bicycle rear-wheel sprocket pairing 13 when viewed axially in the opposite direction, thus from the inside.

On the larger sprocket 14 of the sprocket pairing 13, the same types of teeth or tooth surfaces are designated with the same lowercase letters as on the sprocket 12. To increase the wear-resistance of the sprocket pairing 13, the sprocket 13 also has only exactly one upshift region 34 having exactly one upshift recess formation 36 and exactly one release tooth 38. The upshift recess formation 36 of the sprocket 14 in turn has surface facets which all are arranged so as to be axially recessed with respect to the end face of the sprocket 14 but can be recessed to different extents and/or can be inclined relative to one another, in order, for example, to permit an inclination of the chain about its longitudinal chain direction, and thus to incline an insertion opening located radially inwardly on the chain, into an engagement space of an outer link plate chain link about the longitudinal chain direction towards the tooth head of the catch tooth 44, or in order to be able to incline the chain, which is still in engagement at the release tooth 38, about the longitudinal chain direction at the delivery tooth towards the smaller sprocket 12.

Starting from the catch tooth 44, five teeth are located in the clockwise direction between the catch tooth 44 and the release tooth 38 of the sprocket 14, of which the central tooth has a deflection surface 14d on its tooth surface facing the smaller sprocket 12. This has the same function as previously described in the context of the deflection surface 12d on the smaller sprocket 12.

Starting from the release tooth 38, there are seven teeth between the release tooth 38 and the catch tooth 44 of the sprocket 14, the seven teeth being potentially configured as conventional teeth 14a and 14b, wherein the teeth 14a in turn are potentially configured so as to be thicker than the teeth 14b, specifically preferably having a thickness which exceeds the available width of the engagement space between two parallel inner link plates of an inner link-plate chain link. The number of teeth that in the clockwise direction lie between the release tooth 38 and the catch tooth 44 of the sprocket 14 corresponds to the tooth count of the sprocket 14 minus seven.

It can be seen in the rear view of the sprocket 14 from the inside in FIG. 3B that the thin tooth 14b that in the clockwise direction follows the release tooth 38 in FIG. 3A on the tooth surface of the thin tooth 14b that faces away from the smaller sprocket 12 has a recess surface 14e, the latter configuring this special thin tooth 14b as a mobilizing tooth 14b' of an upshift procedure, the mobilizing tooth 14b' permitting an inner link-plate chain link of a bicycle chain engaged by the mobilizing tooth 14b' more axial clearance for movement than a normal thin tooth 14b.

It can likewise be seen in FIG. 3B that the thin tooth 14b that in the counterclockwise direction is adjacent to the catch tooth 44 in FIG. 3A, on the tooth surface of the thin tooth 14b that faces away from the smaller sprocket 12 has a recess surface 14f, the latter configuring this special thin tooth 14b as a mobilizing tooth 14b" of a downshift procedure, the mobilizing tooth 14b" permitting an inner link-plate chain link engaged by the mobilizing tooth 14b" more axial clearance for movement than a normal thin tooth 14b.

The upshift mobilizing tooth 14b', as a result of the clearance for movement afforded by the latter to the bicycle chain, thus supports an upshift procedure. The downshift mobilizing tooth 14b" supports a downshift procedure.

Starting from the release tooth 38, five teeth lie between the release tooth 38 and the catch tooth 44 of the sprocket 14.

The tooth that in the clockwise direction is adjacent to the catch tooth 44 of the sprocket 14 in turn has a deflection surface 14h which is delimited radially inward by a ramp 14c1 having a radially outwardly pointing support surface for physically supporting an inner link plate of an inner link-plate chain link when downshifting.

The tooth that in the counterclockwise direction is adjacent to the release tooth 38 of the sprocket 14 has a deflection surface 14i which is delimited radially inward by a ramp 14c2 which for physically supporting an inner link plate on an inner link plate chain link when downshifting from the sprocket 12 to the sprocket 14 has a radially outward-pointing support surface. Like the deflection surface 14h in the downshift region 40, the deflection surface 14i in the upshift region 34, when upshifting to the sprocket 14, permits an inner link-plate chain link but not an outer link-plate chain link of the bicycle chain to pass through. The ramp 14c2 having the support surface thereof that points radially outward is preferably shaped so as to be convex, corresponding to the concave design of an inner link plate 54c, so as to enable the inner link plate to bear in an ideally planar manner.

Figure 4B:
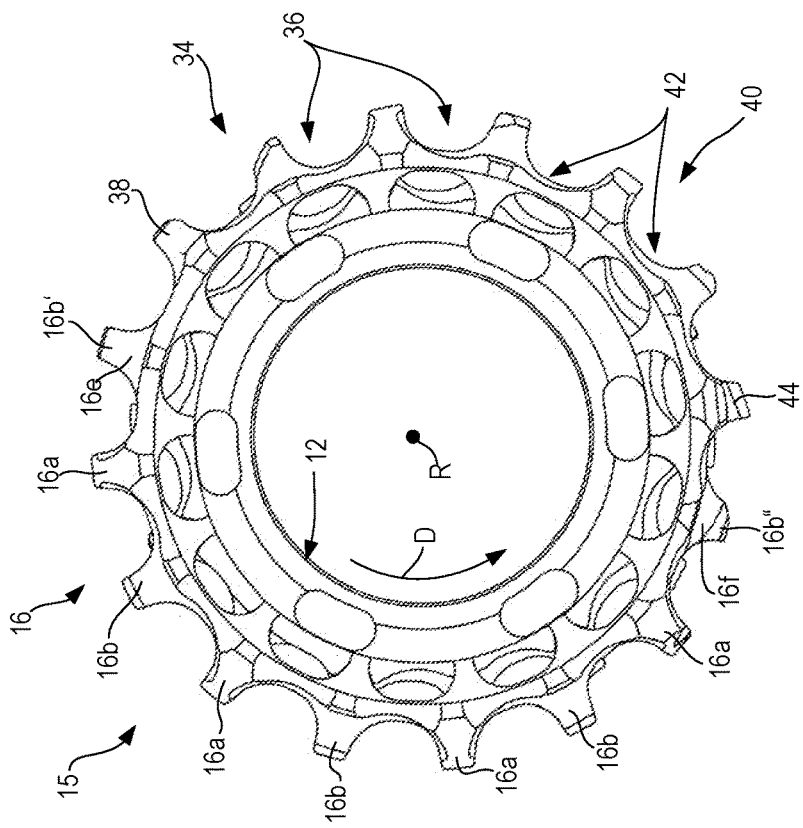
FIG. 4B shows the bicycle rear-wheel sprocket pairing of FIG. 4A when viewed in the opposite direction.
Figure 4A:
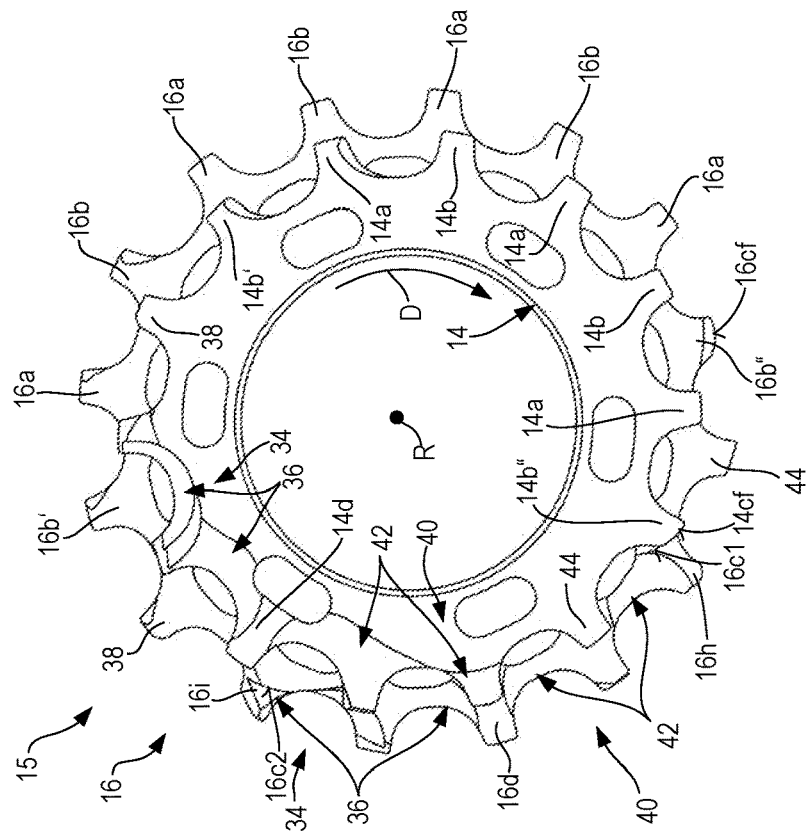
FIG. 4A shows a third bicycle rear-wheel sprocket pairing according to the embodiment of the sprocket cassette of FIGS. 1 to 1B, having a smaller sprocket having 14 teeth and a larger sprocket having 16 teeth, as viewed for reference.

The bicycle rear wheel sprocket pairing 15 having the sprockets 16 and 14 is illustrated in FIGS. 4A and 4B, specifically when viewed as for reference in FIG. 4A and in the opposite direction, thus from the inside, in FIG. 4B. The sprocket 14 of the bicycle rear wheel sprocket pairing 15 is the sprocket 14 of the previously discussed rear-wheel sprocket pairing 13.

Lower-case suffixes after the reference sign 16 of the sprocket 16 refer to functionally identical components or component portions of the sprocket 14 or of the sprocket 12, the components or component portions there being identified by identical lower-case suffixes.

Like the two rear-wheel sprocket pairings 11 and 13 above, the larger sprocket 16 of the rear-wheel sprocket pairing 15 also has only exactly one upshift region 34 having exactly one upshift recess formation 36 and exactly one release tooth 38. The larger sprocket 16 furthermore has only exactly one downshift region 40 having exactly one downshift recess formation 42 and exactly one catch tooth 44.

Starting from the catch tooth 44, five teeth lie in the clockwise direction between the catch tooth 44 and the release tooth 38, wherein the central tooth of the five teeth has a deflection surface 16d which has already been explained in the context of the sprockets 12 and 14 described above.

Starting from the release tooth 38, nine teeth lie in the clockwise direction between the release tooth 38 and the catch tooth 44, the nine teeth for unequivocally orienting the bicycle chain relative to the sprocket 16 in the circumferential direction being configured alternatingly as thick teeth 16a and thin teeth 16b. The thin tooth 16b' that in the clockwise direction is adjacent to the release tooth 38 is a mobilizing tooth for an upshift procedure to the smaller sprocket 14. The thin tooth 16b" that in the counterclockwise direction is adjacent to the catch tooth 44 is a mobilizing tooth for a downshift procedure from the smaller sprocket 14 to the larger sprocket 16. The corresponding recess surfaces 16e of the mobilizing tooth 16b', or 16f of the mobilizing tooth 16b", respectively, are illustrated in FIG. 4B.

The number of teeth in the clockwise direction between the release tooth 38 and the catch tooth 44 corresponds to the tooth count of the sprocket 16 minus seven.

It is notable that the mobilizing tooth 14b" of the sprocket 14, having a convex head surface 14cf, is axially adjacent to the tooth having the deflection surface 16h and having the support ramp 16c1 that delimits this deflection surface 16h so that an inner link-plate chain link 52 that passes axially outward on the deflection surface 16h when downshifting the chain from the sprocket 14 to the sprocket 16 by way of the two inner link plates of the inner link-plate chain link 52 can also be physically supported on the radially inner periphery 52c of the inner link-plate chain link 52, the axially outer inner link plate on the head surface 14cf the axially inner link plate on the ramp 16c1.

Figure 4D:
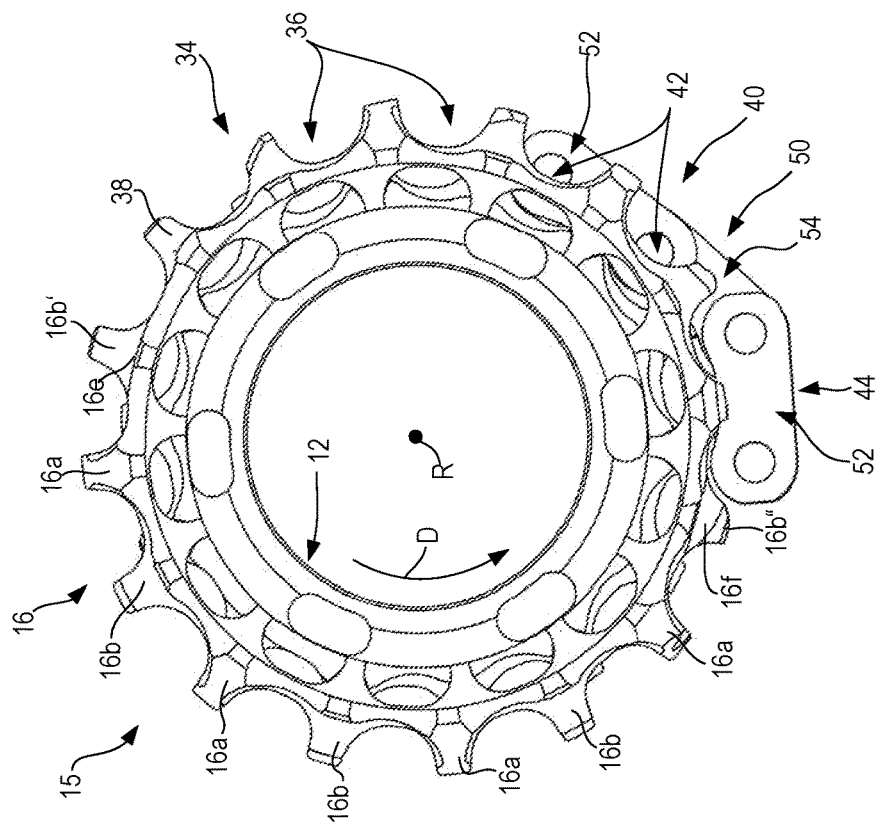
FIG. 4D shows the bicycle rear-wheel sprocket pairing of FIG. 4C when viewed in the opposite direction.
Figure 4C:
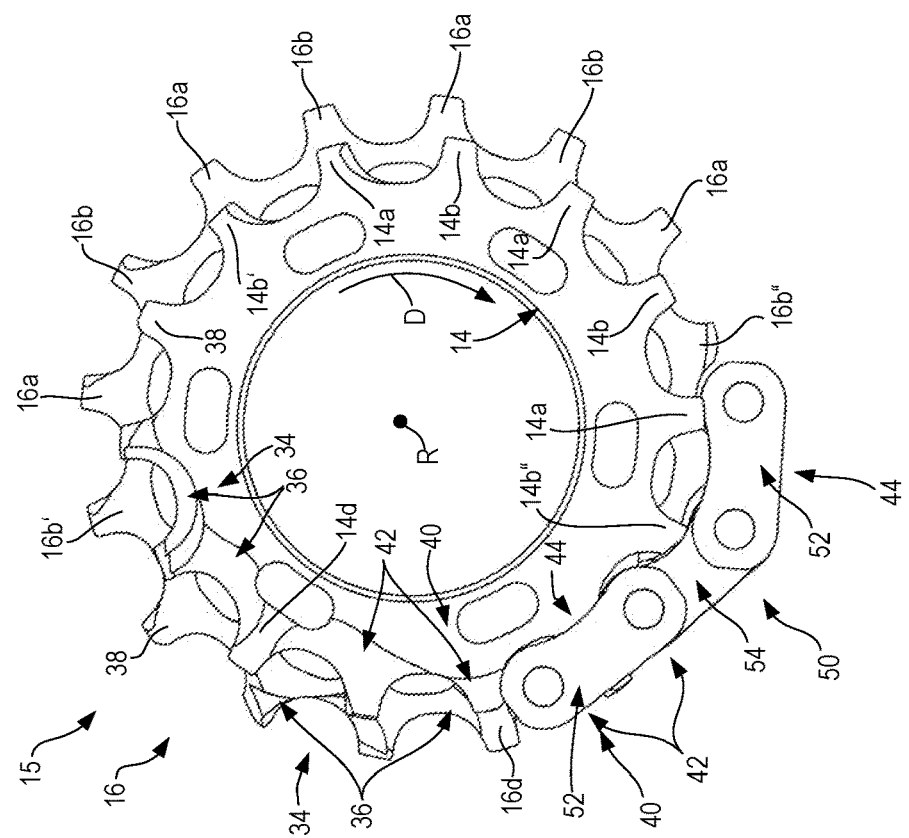
FIG. 4C shows the third bicycle rear-wheel sprocket pairing according to the embodiment of the sprocket cassette of FIG. 4A when downshifting a bicycle chain from the 14-T sprocket to the 16-T sprocket, as viewed for reference.

A downshift procedure of a bicycle chain 50 from the sprocket 14 to the larger sprocket 16 is illustrated in the reference view in FIG. 4C. The catch tooth 44 of the sprocket 16 has already caught the chain 50, more specifically an outer link-plate chain link 54 of the latter. The next outer link-plate chain link 54 in the rotating direction of the drive still engages with the sprocket 14. Only exactly one inner link-plate chain link, which during the shift procedure does not engage with any of the sprockets 14 and 16, is situated in the repositioning path between the sprockets 14 and 16.

FIG. 4D shows the shift procedure of FIG. 4C in the opposite viewing direction, thus axially from the inside.

Figure 4F:
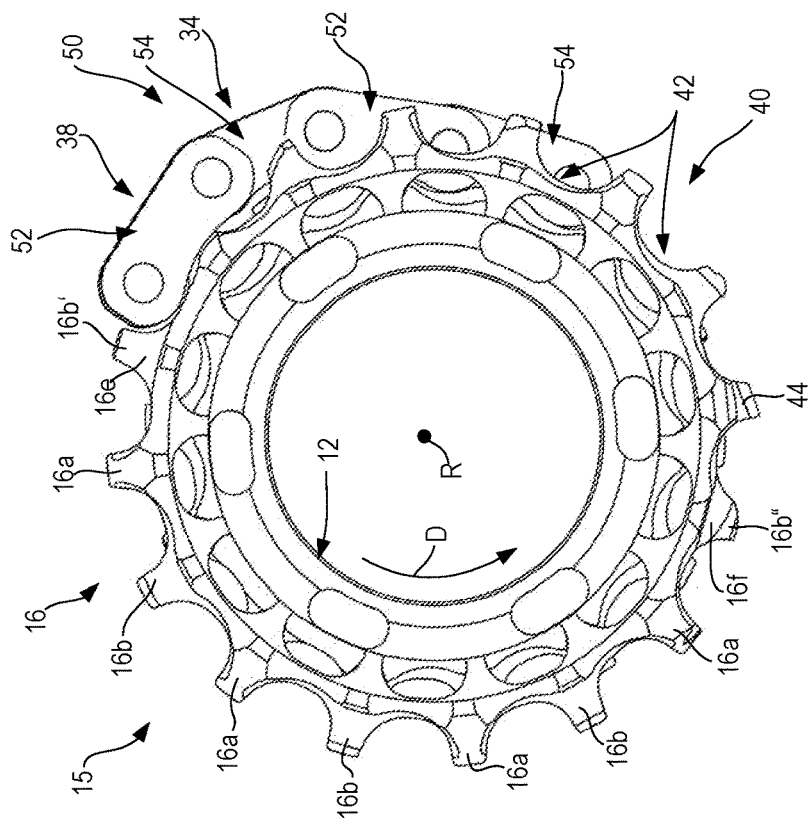
FIG. 4F shows the bicycle rear-wheel sprocket pairing of FIG. 4E when viewed in the opposite direction.
Figure 4E:
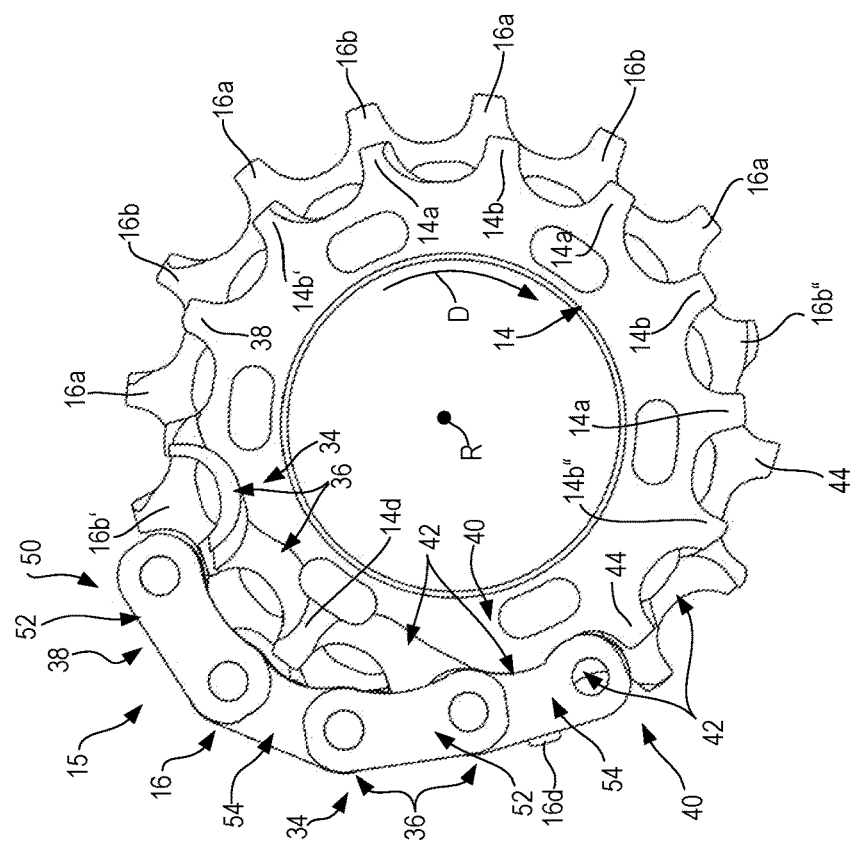
FIG. 4E shows the third bicycle rear-wheel sprocket pairing according to the embodiment of the sprocket cassette of FIG. 4A when upshifting a bicycle chain from the 16-T sprocket to the 14-T sprocket, as viewed for reference.

An upshift procedure of a bicycle chain 50 from the sprocket 16 to the larger sprocket 14 is illustrated in the reference view in FIG. 4E. The release tooth 38 of the sprocket 16 still engages with the chain 50, more specifically with an outer link-plate chain link 54 of the latter. The outer link-plate chain link 54 that is next in the rotating direction of the drive is already engaged by a tooth of the sprocket 14. Only exactly one inner link-plate chain link 52, which during the shift procedure does not engage with any of the sprockets 14 and 16, is situated in the repositioning path between the sprockets 14 and 16.

FIG. 4F shows the shift procedure of FIG. 4E in the opposite viewing direction, thus axially from the inside.

Figure 5B:
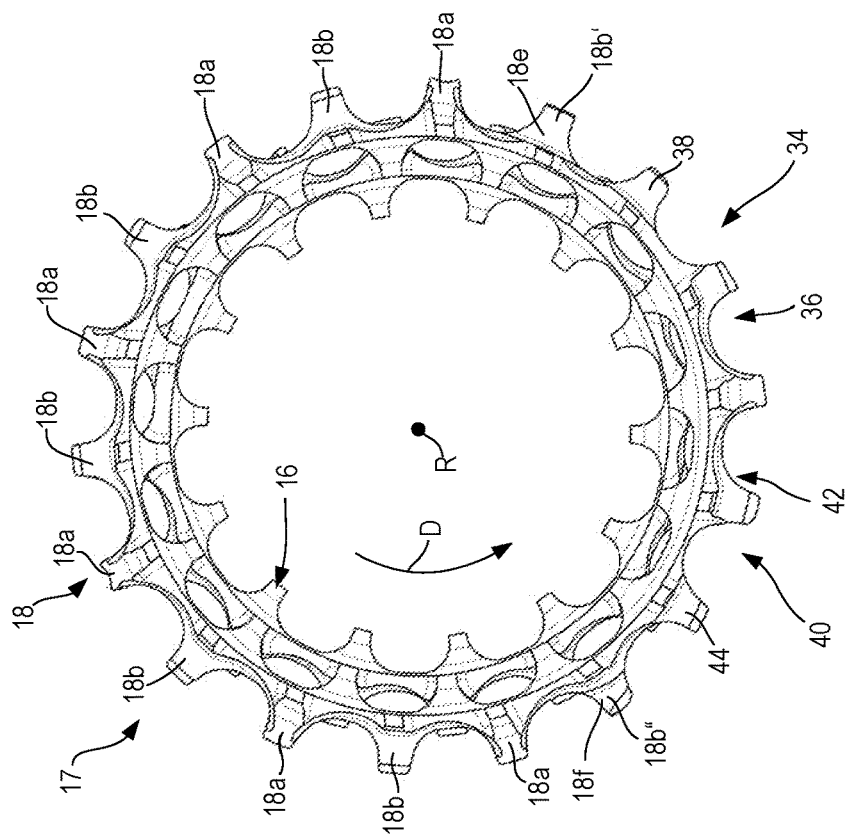
FIG. 5B shows the bicycle rear-wheel sprocket pairing of FIG. 5A when viewed in the opposite direction.
Figure 5A:
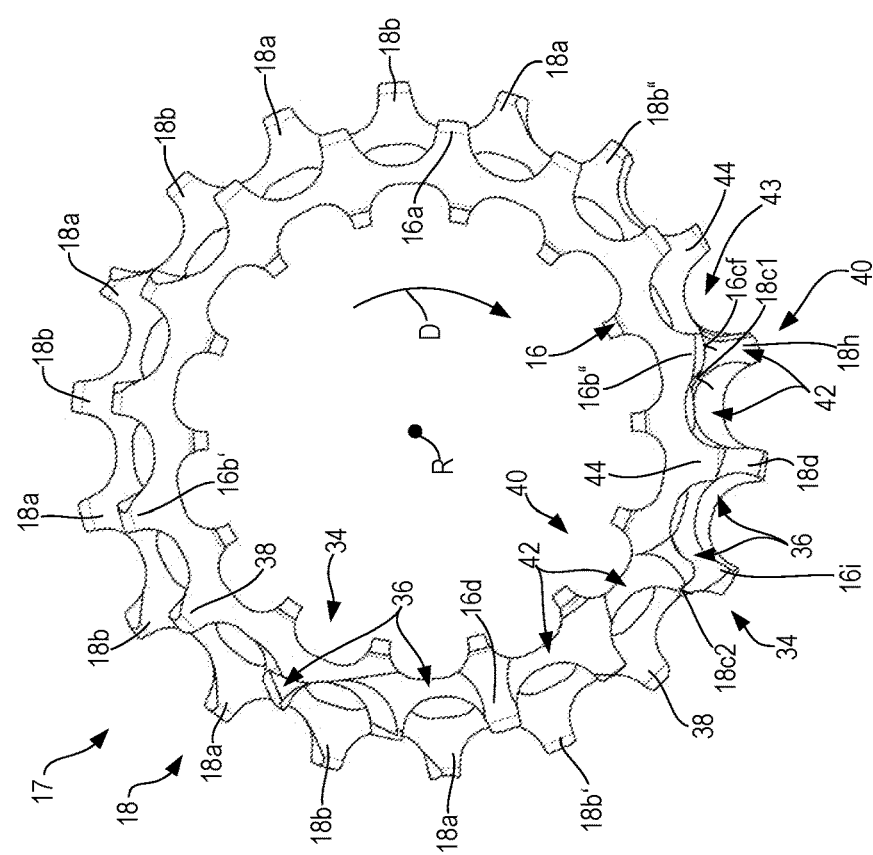
FIG. 5A shows a fourth bicycle rear-wheel sprocket pairing according to the embodiment of the sprocket cassette of FIGS. 1 to 1B, having a smaller sprocket having 16 teeth and a larger sprocket having 18 teeth, as viewed for reference.

In a manner corresponding to proceeding FIGS. 3A and 3B, or 4A and 4B, respectively, the largest and last bicycle rear-wheel sprocket pairing 17 is illustrated in FIGS. 5A and 5B, specifically viewed as for reference in FIG. 5A and viewed in the opposite axial direction from the inside in FIG. 5B.

Lower-case suffixes after the reference sign 18 of the sprocket 18 refer to functionally identical components or component portions of the sprockets 12, 14 or 16, the components or component portions there being identified by identical lower-case suffixes.

Like the previously discussed rear-wheel sprocket pairings 11, 13 and 15, the rear-wheel sprocket pairing 17 on the larger sprocket 18 has only exactly one upshift region 34 having exactly one upshift recess formation 36 and having exactly one release tooth 38. The larger sprocket 18 moreover has only exactly one downshift region 40 having exactly one downshift recess formation 42 and having exactly one catch tooth 44.

Starting from the catch tooth 44, in a manner particularly advantageous for the wear-resistance of the sprocket 18, only three teeth are present on the larger sprocket 18 in the clockwise direction between the catch tooth 44 and the release tooth 38. Starting from the release tooth 38, thirteen teeth are present in the clockwise direction between the release tooth 38 and the catch tooth 44, this corresponding to the tooth count of the sprocket 18 minus five.

Of the thirteen teeth that in the clockwise direction lie between the release tooth 38 and the catch tooth 44, those teeth that are in each case directly adjacent to the release tooth 38, or the catch tooth 44, respectively, are configured in the previously described manner as mobilizing teeth 18b' and 18b", respectively. The remaining teeth, for reliably guiding the chain on the sprocket 18 during a meshing engagement, are configured in the manner described above as thick teeth 18a and thin teeth 18b.

When downshifting from the sprocket 16 to the sprocket 18, an inner link-plate chain link by way of the two inner link plates thereof can also be supported once on the head surface 16cf and once on the ramp 18c1. The tooth intermediate space 43 that in the clockwise direction is in front of the catch tooth 44 of the sprocket 18 is enlarged in a radially inward manner so as to, when downshifting to the sprocket 18, provide the chain roller that directly leads the catch tooth 44 space for radial movement towards the inside.

The previously described sprocket pairings 11, 13, 15 and 17 can in each case upshift from the respective larger sprocket to the respective next smaller sprocket axially adjacent thereto only in the upshift region 36. This means the chain on each larger sprocket of the mentioned sprocket pairings 11, 13, 15 and 17 is repositioned from the smaller sprocket to the next smaller sprocket only at exactly one location, specifically so that the respective release tooth 38 is the last tooth of the larger sprocket that still engages with the chain. Because of the rotating direction of the drive D shown, chain links that in the counterclockwise direction are contiguous to the release tooth 38 slide laterally past the teeth that in the counterclockwise direction are adjacent to the release tooth 38, thereby utilizing the respective upshift recess formation 36 as a space for movement.

Likewise, the chain on the mentioned sprocket pairings 11, 13, 15 and 17 can in each case be repositioned from the smaller to the larger sprocket only at one location, specifically at all times only so that the catch tooth 44 of the larger sprocket is the first tooth of the larger sprocket that engages between two link plates, typically outer link plates, of a chain link. The chain links that in the clockwise direction are adjacent to the catch tooth 44 move closer to the respective larger sprocket while utilizing the downshift recess formation 42, such that outer link-plate chain links assigned to the catch tooth 44 can engage axially in the engagement region of the larger sprocket.

When the shift command by the cyclist is delivered such that the respective relevant shift tooth, i.e. the release tooth 38 or the catch tooth 44, on the larger sprocket rotating in the clockwise direction has just passed the shift region on the rear wheel, the initiated shift procedure takes place in the next sprocket revolution, when the release tooth 38 or the catch tooth 44 makes its way back into the angular range, or shift region, respectively, which relative to the derailleur is relevant to a shift procedure being carried out. The shift latency for downshifting as well as for upshifting on the sprocket pairings 11, 13, 15 and 17 is at most one sprocket revolution, this usually being tolerated by cyclists. According to experience, higher shift latencies are no longer tolerated but perceived as a malfunction.

The sprocket 18 is the smallest of three sprockets 18, 20 and 22 of a transition sprocket group 19, the latter by way of the sprocket 20 having the single odd sprocket of the rear-wheel cassette 1.

Figure 6:
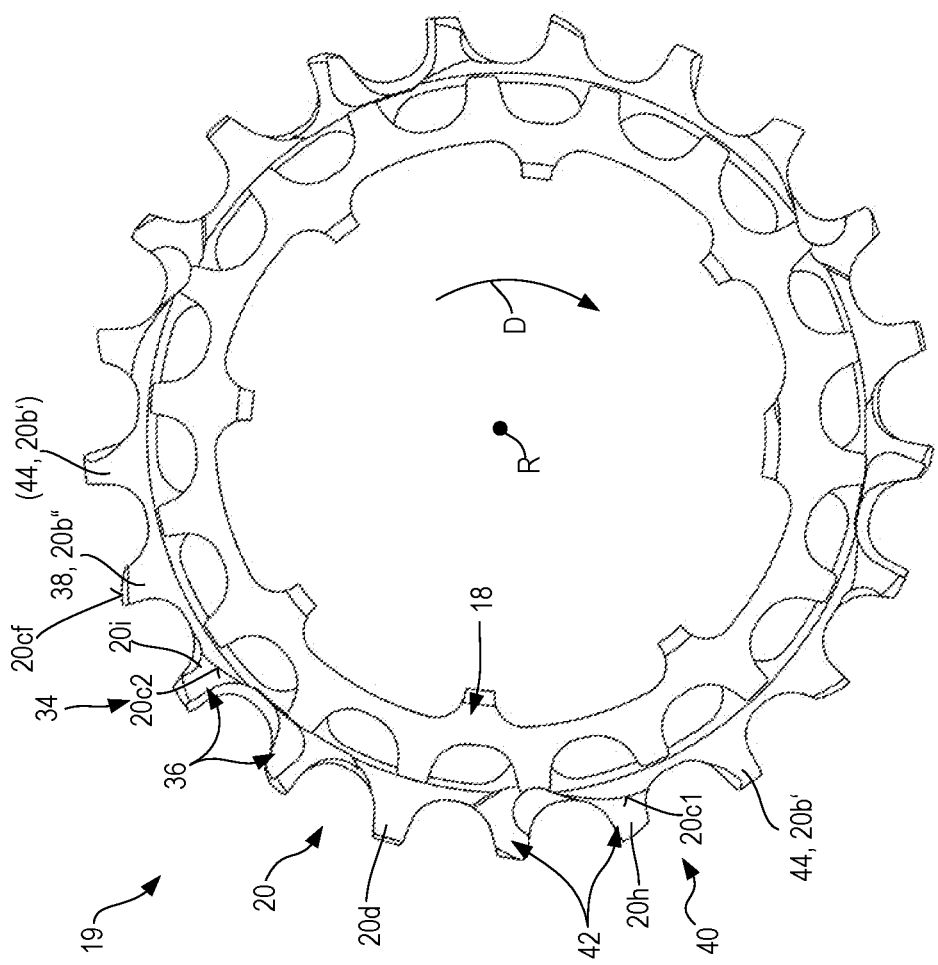
FIG. 6 shows a bicycle rear-wheel sprocket pairing of the sprocket cassette of FIGS. 1 to 1B, having a smaller sprocket having 18 teeth and having a larger sprocket having 21 teeth, as viewed for reference, wherein the rear-wheel sprocket pairing is associated with a transition sprocket group having a total of three sprockets.

The smaller sprocket pairing of the sprockets 20 and 18 of the transition sprocket group 19 is shown in the reference view in FIG. 6.

Lower-case suffixes after the reference sign 20 of the sprocket 20 refer to functionally identical components or component portions of the sprockets 12, 14, 16 or 18, the components or component portions there being identified by identical lower-case suffixes.

There is a problem in that each tooth of the even sprocket 18, for the entire duration of the meshing engagement between the sprocket 18 and the bicycle chain, is assigned the same type of chain link for engaging between the respective link plates of the respective chain link.

However, on the odd sprocket 20 having twenty-one teeth, the type of chain link assigned to a tooth for engaging in a form-fitting manner changes with each revolution. Nevertheless, the chain is to be transferred from the odd sprocket 20 in a defined manner to the sprocket 18 in terms of the relative position of the chain link sequence to the sprocket 18 when upshifting, as well as transferred in a defined manner to the sprocket 22 when downshifting. It is not intended that coincidence decides whether a tooth on the even sprockets 20 and 22 engages with an outer link-plate chain link or an inner link-plate chain link, but a defined repositioning of the chain is to be ensured by a corresponding configuration of the transition sprocket group 19.

To this end, the transition sprocket 20 has three identical circumferential portions having in each case seven teeth, the latter sequentially forming the entire circumference of the transition sprocket 20. Each of the three circumferential portions in turn has only exactly one release tooth 38 and only exactly one catch tooth 44. Likewise, each of the three circumferential portions has only exactly one upshift region 34 having exactly one upshift recess formation 36, and only exactly one downshift region 40 having exactly one downshift recess formation 36. The shift latency of the transition sprocket 20 is very short as a result of the three circumferential portions being in sequence. On the sprocket 20, five teeth are situated in the clockwise direction between the catch tooth 44 and the release tooth 38. In the circumferential direction of the sprocket 20, six teeth are situated between two release teeth 38, or between two catch teeth 44, respectively. When an inner link plate in a downshift procedure, for whatever reason, is undesirably moved from the sprocket 18 closer to the catch tooth 44 of the sprocket 20, and therefore a form-fitting engagement between the catch tooth 44 and the bicycle chain does not occur, an outer link plate and thus an outer link-plate chain link is moved closer to that catch tooth 44 of the sprocket 20 that is the next in the counterclockwise direction while utilizing the space of movement provided by the downshift recess formation 42, the catch tooth 44 being able to catch the outer link-plate chain link.

The same applies in an analogous manner to the upshift procedure and to the release tooth 38 of the sprocket 20. When an inner link-plate chain link is situated so as to be engaged in the form-fitting manner with the release tooth 38 immediately after the upshift procedure is initiated by the cyclist, the bicycle chain still remains on the sprocket 20 until the next release tooth 38 in the counterclockwise direction engages with an outer link-plate chain link and the bicycle chain can then be repositioned to the smaller sprocket 18 while utilizing the space for movement made available by the upshift recess formation 36.

The catch tooth 44 and the release tooth 38 are extremely advantageously disposed such that, when the three identical circumferential portions are in sequence, the release tooth 38 and the catch tooth 44 are direct neighbours. Because the teeth 38 and 44, being a release tooth or catch tooth, respectively, are already of a particular configuration, and typically have a smaller thickness and a pronounced axial approximation to the adjacent smaller sprocket 18, the teeth 38 and 44 not only act as a release tooth 38 or a catch tooth 44, respectively, but the release tooth 38 forms a mobilizing tooth 20*b*″ for the catch tooth 44, and the catch tooth 44 forms a mobilizing tooth 20*b*′ for the release tooth 38.

As a result of this dual function of the release tooth 38 and the catch tooth 44, the latter being in each case also a mobilizing tooth 20*b*″ and 20*b*′, respectively, no additional structural tooth weakenings are required by configuring dedicated mobilizing teeth, despite three circumferential portions having in each case at least two modified teeth 38 and 44 being in sequence, the teeth 38 and 44 as a result being weakened and in terms of the strength thereof, this overall leading to a stable and wear-resistant transition sprocket 20.

Figure 7:
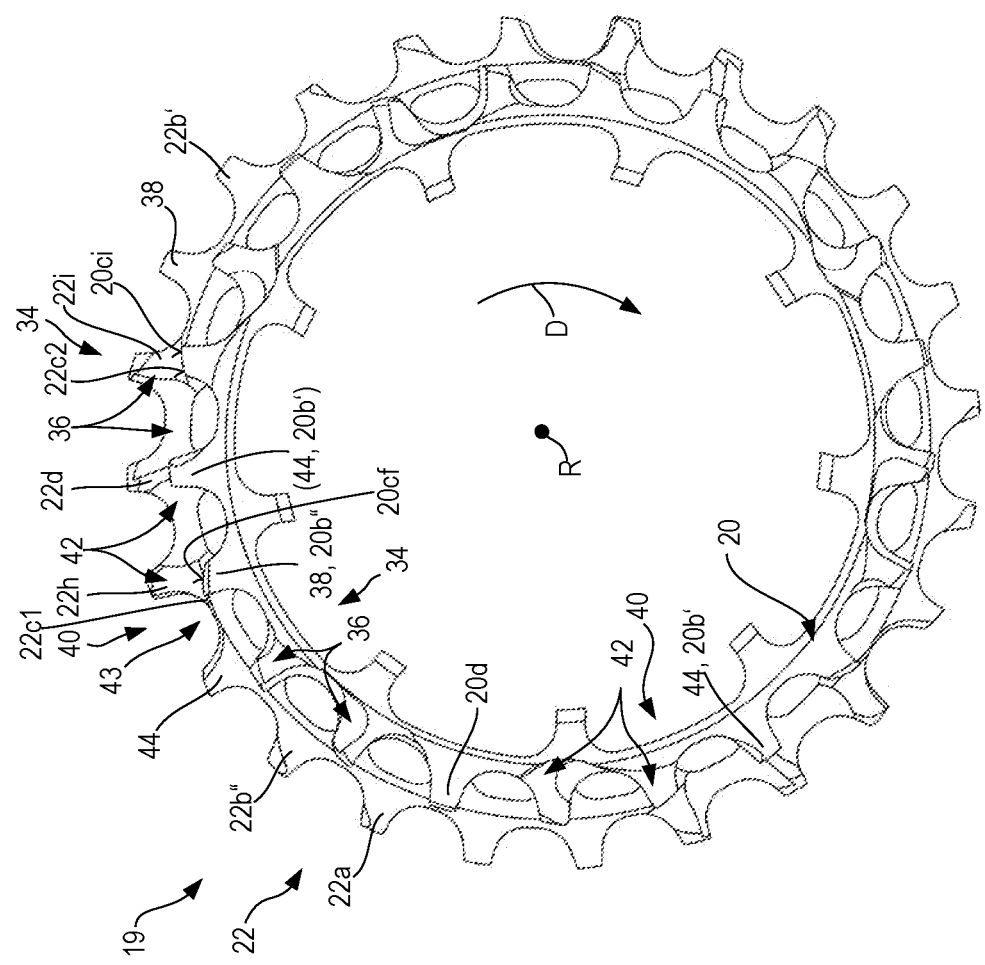
FIG. 7 shows a bicycle rear-wheel sprocket pairing of the sprocket cassette of FIGS. 1 to 1B, having a smaller sprocket having 21 teeth and a larger sprocket having 24 teeth, as viewed for reference, wherein the rear-wheel sprocket pairing is associated with the transition sprocket group having a total of three sprockets.

The larger sprocket pairing of the transition sprocket group 19 having the 24-T sprocket 22 and the 21-T sprocket 20 is illustrated in the reference view in FIG. 7.

It is also important here that the bicycle chain is repositioned from the odd sprocket 20 to the larger sprocket 22 by way of an unequivocal relative disposal of the chain link sequence.

Identical lower-case suffixes after the reference sign 22 of the sprocket 22 refer to functionally identical components or component portions of the sprockets 12, 14, 16, 18 or 20, the components or component portions there being identified by identical lower-case suffixes.

The 24-T sprocket 22 likewise has three identical circumferential portions which in the circumferential direction sequentially form the entire circumference of the sprocket 22. Each circumferential portion therefore has eight teeth. For the sake of simplicity, only one exactly one circumferential portion of the sprocket 22 in FIG. 7 is provided with reference signs.

The mobilizing tooth 22*b*′ for the release tooth 38 that is adjacent in the counterclockwise direction is situated at the extreme end of the circumferential portion in the clockwise direction. Continuing further in the counterclockwise direction, three teeth are contiguous to the release tooth 38, the upshift recess formation 36 and the downshift recess formation 42 being configured on the three teeth, wherein a deflection surface 22*d* is configured on the central tooth of the three teeth.

Contiguous to the three teeth in the counterclockwise direction is the catch tooth 44, the latter in the counterclockwise direction in turn being adjacent to the mobilizing tooth 22*b*″ thereof. Situated at the extreme end of the circumferential portion in the counterclockwise direction is a regular tooth of the sprocket 22, the regular tooth in an exemplary manner being configured as a thick tooth 22*a* in such a manner that the thick tooth can engage only with an outer link-plate chain link.

While the mobilizing teeth 22*b*′ and 22*b*″ here are configured additionally to a release tooth 38 and a catch tooth 44, both recess formations 36 and 42 for downshifting and upshifting are configured on a space of only three teeth so that a moderate structural weakening by subtracting material on the sprocket 22 is overall implemented, and the sprocket 22 overall has a high degree of stability and wear-resistance. The larger a sprocket, the less relevant the configurations of recess formations and the like as a structural weakening are to the strength of the sprocket.

While it is unknown by virtue of the unknown number of revolutions of the sprocket 20 in which relative position in terms of the chain link sequence the bicycle chain is transferred from the sprocket 20 to the sprocket 22 when downshifting, that catch tooth 44 that is approached by an external link-plate chain link will catch the chain by way of engaging in a form-fitting manner with the chain link, and thus ensure a downshift procedure. The latest to do so is at most the second catch tooth 44 which relative to the derailleur causing the shift procedure makes its way to the relevant shift region.

Likewise, the chain per circumferential portion of the sprocket 22 is transferred to the smaller sprocket 20 by exactly one single tooth, specifically the release tooth 38, the latter being the last tooth to engage. Because the release tooth 38 on the sprocket 22 is at all times assigned an outer link-plate chain link, a downshift procedure from the sprocket 22 to the sprocket 20 takes place on the next release tooth 38 that passes the shift region of the derailleur. This means a very short shift latency of only a third of a rotation and a smallest possible weakening of the sprocket 22 because of only one tooth per circumferential portion being configured as a release tooth 38.

The radially inner root surface of the tooth intermediate space 43, which in the clockwise direction is directly adjacent to the catch tooth 44, in radial terms is situated closer to the sprocket axis R than the tooth root surfaces of the remaining tooth intermediate spaces. As a result of the movement path radially towards the inside thus made available for a chain roller, the repositioning path travelled by the bicycle chain when repositioning the latter from the smaller sprocket 20 to the larger sprocket 22 can be adapted such that the length of the repositioning path is an integer multiple of the chain pitch. This is a parameter for a shift procedure between two sprockets.

Supporting both inner link plates of an inner link-plate chain link on the sprocket pairing 19, when upshifting from the sprocket 22 to the sprocket 20, is also possible, specifically on the head surface 20*ci* for the inner link plate that axially lies further outside, and on the ramp 22*c*2 for the inner link plate that axially lies further inside, the ramp 22*c*2 delimiting the deflection surface 22*i* radially towards the inside. The head surface 20*ci* for supporting a concave inner periphery 54*c* of an inner link plate in an ideally planar manner is configured so as to be convex, wherein the leading end of the head surface 20*ci* in the rotating direction of the drive is disposed so as to be radially further outside than the trailing end of the head surface 20*ci*.

Figure 8:
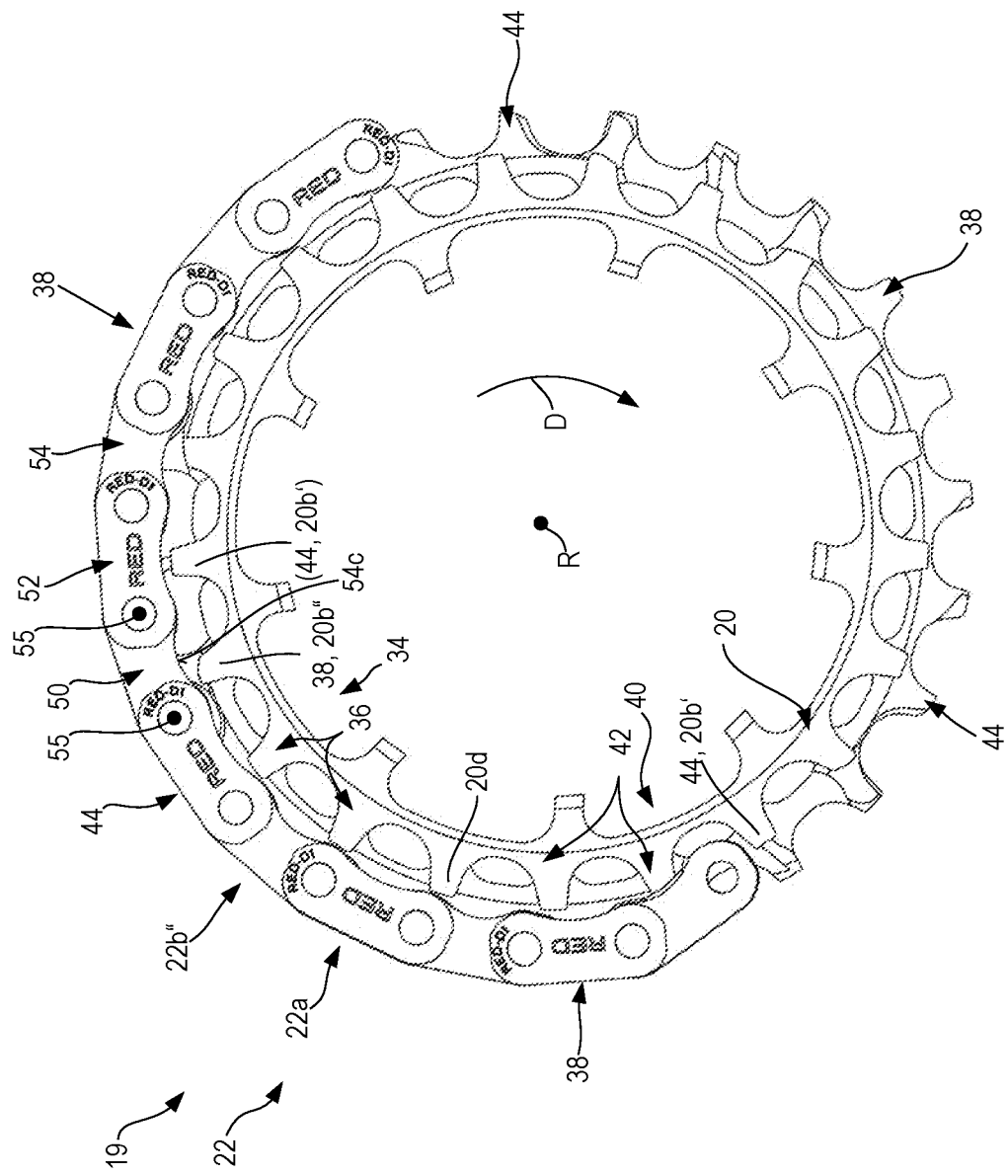
FIG. 8 shows the bicycle rear-wheel sprocket pairing of FIG. 7, having a bicycle chain which engages with the larger sprocket and is shifted down to the smaller sprocket.

It is illustrated in an exemplary manner in FIG. 8 how a bicycle chain 50 composed of a sequence of outer link-plate chain links 52 and inner link-plate chain links 54 is upshifted from the sprocket 22, engaging in a meshing manner with the latter, to the smaller sprocket 20. It can be seen that the release tooth 38 is the last tooth of the sprocket 22 that engages with the bicycle chain 50.

Figure 9:
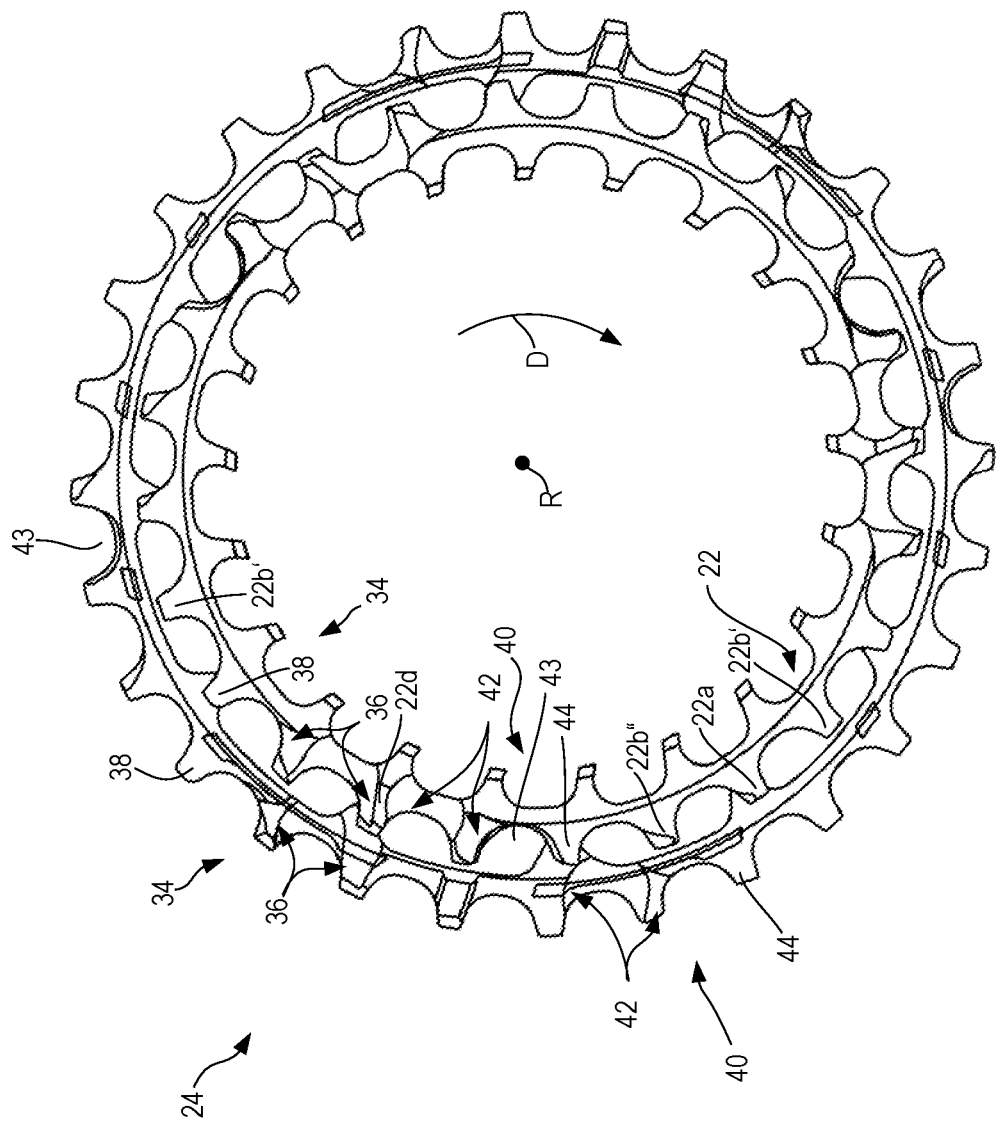
FIG. 9 shows a bicycle rear-wheel sprocket pairing of the sprocket cassette of FIGS. 1 to 1B, having a smaller sprocket having 24 teeth and a larger sprocket having 28 teeth.

A sprocket pairing composed of the 28-T sprocket 24 and the previously discussed 24-T sprocket 22 is illustrated in a purely exemplary manner in FIG. 9. The sprocket 22 has already been discussed above. In principle, the sprocket 24 along the circumference thereof has two upshift regions 34 and two downshift regions 40, wherein regions 34 and 40, respectively, that shift in the same direction lie diametrically opposite one another on the sprocket 24.

Identical lower-case suffixes after the reference sign 24 of the sprocket 24 refer to functionally identical components or component portions of the sprockets 12, 14, 16, 18, 20 or 22, the components or component portions there being identified by identical lower-case suffixes.

The sprocket 24 also has tooth intermediate spaces 43 having a tooth root surface which is offset radially towards the sprocket axis R. However, these tooth intermediate spaces 34 are not relevant in the context of repositioning the chain between the adjacent sprockets 24 and 22, but are relevant in the context of repositioning the chain between the sprocket 24 and the next larger sprocket 26.

Figure 10:
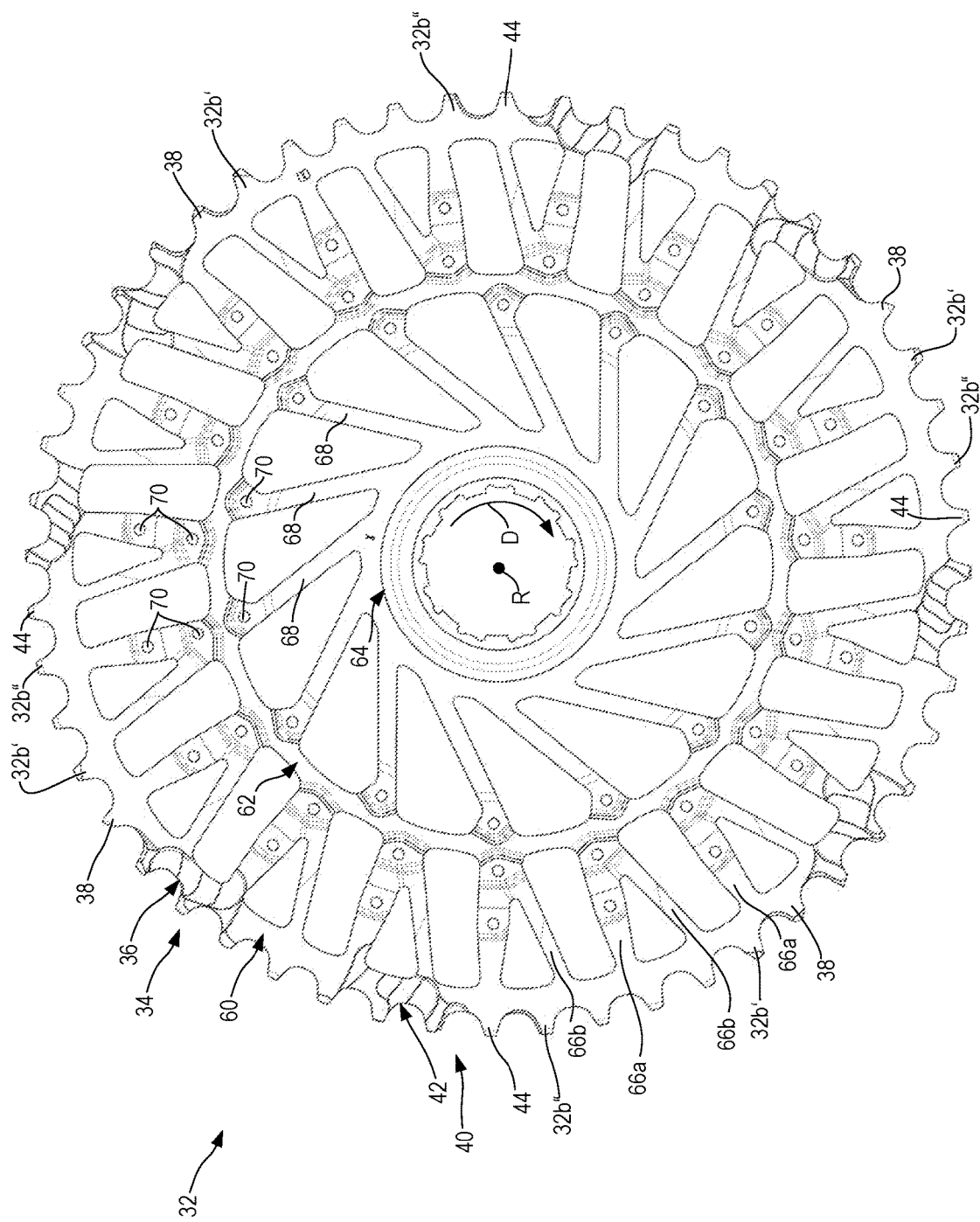
FIG. 10 shows a larger sprocket of the sprocket cassette of FIGS. 1 to 1B as viewed for reference.

The largest sprocket 32 in the reference view in FIG. 10 is illustrated so as to be detached from the remaining sprockets 10 to 30. The sprocket 32 comprises a gear ring 60, an intermediate gear ring 62, and a radially inner wedged gear ring 64 for transmitting torque to a driver, the latter not being illustrated but being readily known to person skilled in the art, or to an adapter which is disposed between the wedged gear ring 64 and the driver. The wedged profile of the adapter or driver that interacts with the radially inner profile of the wedged gear ring 64 is configured so as to be complimentary to the radially inner wedged profile of the wedged gear ring 64. Radially outer arms 66a and 66b connect the gear ring 60 in a torque-transmitting manner to the intermediate gear ring 62. Radially inner stays 68 connect the intermediate gear ring to the wedged gear ring 64.

In order to avoid undesirable deformations of the arms 66b and 68 by bending, the latter are disposed in such a manner that the radial inner stays end of the arms 66b and 68 lead the radially outer stays in the rotating direction of the drive D. The arms 66a in the circumferential direction are configured so as to be wider than the arms 66b.

Fastening openings 70 indicate where the sprocket dome, composed of the sprockets 14 to 30 that are integrally connected to one another and the smaller sprockets 12 and 10 that are screwed to the sprocket dome, is connected in a torque-transmitting manner to the largest sprocket 32 by way of connection means such as pins, rivets, screws and the like.

The fastening bores 70 are radially disposed so as to be as far outside as possible, on the one hand, without however interfering with the engagement between sprocket teeth and the bicycle chain, and are configured in ideally stable regions of the sprocket 32, on the other hand. Therefore, the fastening bores 70 are predominantly configured in the wider, radially outer, arms 66a and close to the connection points between the intermediate gear ring 62 and the radially inner arms 68.

A view of the largest sprocket 32 is illustrated in FIG. 10A, with the viewing direction being orthogonal to the sprocket axis R. It can be seen therein that the sprocket 32 in regions which radially lie close to the sprocket axis R is configured so as to be angled toward the outside, thus away from the longitudinal central plane LME. As a result, ideally little axial installation space for receiving the twelvefold sprocket cassette 1 is required on the driver that is situated radially within the wedged gear ring 64. Moreover, the larger sprocket 32 is thus reinforced in relation to bending torques which as a result of oblique running of the chain act on the larger sprocket 32. The sprocket 32 and the sprocket dome connected thereto have a mutual reinforcing effect.

The sprocket cassette 1 is configured in such a manner that all smaller sprockets 10 to 30 transmit the torque thereof directly to the sprocket 32, the sprocket 32, by way of the previously mentioned driver, transmitting the torque which emanates from the cyclist or the electric motor and is transmitted to the sprocket cassette 1 by means of the bicycle chain 50, to the rear-wheel hub.

As can be seen on the side of the sprocket 32 that points to the longitudinal central plane LME, that side being the side viewed by the observer of FIG. 10B, thick teeth 32a and thin teeth 32b are configured so as to be alternating sequentially also on the largest sprocket 32. The recesses on the tooth surfaces which for configuring thin teeth 32b point in the axial direction, are configured exclusively on that side of the larger sprocket 32 that pointing away from the next smaller sprocket 30.

Identical lower-case suffixes after the reference sign 32 of the sprocket 32 refer to functionally identical components or component portions of the sprockets 12, 14, 16, 18, 20, 22 or 24, the components or component portions there being identified by identical lower-case suffixes.

Moreover shown in FIG. 10B is a configuration of ramps on many release teeth 38, on many catch teeth 44, as well as the mobilizing teeth 32b' and 32b" that are adjacent to the ramp-forming release teeth 38 and catch teeth 44. The ramps are identified by the reference sign of the respective tooth and the lower-case suffix g. The ramps on the mobilizing teeth are identified by the same apostrophes as the associated mobilizing teeth.

The ramps 38g, 32g', 44g and 32g" form a radial and an axial step of the tooth surface of the associated teeth 38, 32b', 44 and 32b" facing away from the next smaller sprocket 30. The ramps 38g, 32g', 44g and 32g" form a ramp surface which points radially outward, i.e. away from the sprocket axis R, on which peripheral surfaces of the bicycle chain 50 that point radially inward can be supported.

As a result of these ramps 38g, 32g', 44g and 32g", the chain 50 is stabilized particularly when engaging in a meshing manner with the largest sprocket 32.

When pedaling backwards while utilizing the freewheeling mechanism usually present on the rear-wheel hub, the oblique running of the chain can under certain circumstances have a stabilizing effect on the meshing engagement between the sprocket 32 and the bicycle chain 50. Because the release teeth 38 in particular, and the mobilizing teeth 32b' adjacent thereto, by virtue of the design embodiment thereof assist repositioning of the chain towards the next smaller sprocket 30, the oblique running acting towards the latter, a ramp is above all configured thereon. Ramps for stabilizing the chain 50 are also configured on the shift-relevant teeth of a downshift region, thus on the catch tooth 44 and the mobilizing tooth 32b" thereof.

The mentioned ramps do not only keep the chain on the sprocket 32, even in the case of a very unfavourable effect of oblique running of the chain towards the front chain ring, but also assist the shifting of the chain 50 down to the larger sprocket 32, or up from the larger sprocket 32 to the next smaller sprocket 30, respectively. The ramps form specifically the possibility that the chain in the shift-relevant regions, i.e. the upshift region 34 and the downshift region 40, can be kept on the sprocket 32 in a stable manner and by way of physical guiding also in a position that lies radially further outside than this would be the case in a conventional engagement of the teeth in which the catch tooth 44, the release tooth 38, or the mobilizing teeth 32b" or 32b', respectively, adjacent thereto engage radially completely into the intermediate spaces of the chain links.

The ramps thus stabilize the chain 50 in relation to the oblique running of the chain towards the front chain ring when the chain guide roller of the derailleur for holding the chain on the larger sprocket 32 is aligned so as to be coplanar with the sprocket 32, and the oblique running of the chain acts counter to the chain 50 been kept on the sprocket 32. The ramps furthermore assist repositioning of the chain 50 when the chain guide roller of the derailleur is aligned so as to be coplanar with the future chain-guiding sprocket while the chain 50 still engages on the current chain-guiding sprocket.

The shown ramps can also be configured on the sprockets 30, 28, 26, etc., specifically preferably in each case on that side of the respective sprocket that faces away from the next smaller sprocket. However, because the oblique running of the chain decreases towards the medium-sized sprockets of the sprocket cassette 1, the ramps are of particular importance on the larger sprocket 32, 30 and also 28.

A bicycle provided with the sprocket cassette 1 according to an aspect of the disclosure is illustrated in a highly schematic manner and in general identified by the reference sign 70 in FIG. 11. A front wheel 72 and a rear wheel 74 are mounted on a bicycle frame 76 so as to be rotatable about respective wheel axes that are orthogonal to the drawing plane of FIG. 11. The front wheel 72 can also be connected to the bicycle frame 76 by way of a suspension fork 78. The rear wheel 74 can also be connected to the bicycle frame 76 by way of a suspension 80.

The rear wheel 74 is able to be driven by way of a drive assembly 82 comprising a single front chain ring 24 and the bicycle rear-wheel sprocket cassette 1 which is illustrated in a highly schematic manner only in FIG. 1. The drive torque can be transmitted to the front chain ring 84 by way of foot pedals 88 and a pedal crankshaft 88*a* connected thereto, and by the chain ring 84 be transmitted to the rear wheel 74 by means of the bicycle chain 50 by way of the sprocket cassette 126. For assisting a cyclist driving the foot pedals 88 with muscular force, an assisting electric motor 90 on the bicycle frame 76 can be disposed in such a manner that also this electric motor 90 transmits the assisting drive torque thereof to the front chain ring 84 by way of the pedal crankshaft 88*a*. A gearbox, in particular a planetary gearbox, can be provided between the pedal crankshaft 88*a* and the chain ring 84. The transmission ratio of the gearbox is to be taken into account when calculating the effective tooth count of the chain ring 84. The actual tooth count of the chain ring 84 here is to be multiplied by the factor by which the gearbox transmits a torque introduced thereto to the drive output side of the gearbox. An increase of the torque by the gearbox thus leads to an effective tooth count of the chain ring 84 that is increased in relation to the actual tooth count and vice versa.

A battery 92 as an energy accumulator for the assisting electric motor 90 can be provided in or on the frame 76.

The bicycle chain 50, by a shift mechanism or by a derailleur 94, for transmitting torque to the rear wheel 74, can be brought to engage in a known meshing manner with a sprocket to be selected by the cyclist, the sprocket being selected from the plurality of sprockets 10 to 32 of the sprocket cassettes 1. The derailleur 94 has a chain guide roller 96 which lies closest to the sprocket cassette 1 and a tension roller 98.

The muscular torque of the cyclist as well as the assisting torque of the electric motor 90 on the exemplary bicycle 70 are transmitted to the rear wheel 74 by way of the rear-wheel sprocket cassette 1. The electric motor 90 thus has the effect as if the cyclist could access on demand a pedaling output increased by the assisting output of the electric motor 90.

Because the bicycle 70 shown in an exemplary manner possesses exactly one front chain ring 84, the entire gear range of the bicycle 70 is implemented by way of the sprocket cassette 1.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations and/or acts are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that any described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. A bicycle rear-wheel sprocket pairing for engaging in a force-transmitting manner with a bicycle roller chain and rotatable about a sprocket axis, wherein the sprocket axis defines an axial direction running along the sprocket axis, a radial direction running so as to be orthogonal to the sprocket axis, and a circumferential direction encircling the sprocket axis, the rear-wheel sprocket pairing comprising:
a larger sprocket; and
a smaller sprocket which for rotating conjointly with the larger sprocket in a slip-free manner about the sprocket axis is connected to the larger sprocket so as to be coaxial with and axially directly adjacent to the latter, wherein the larger sprocket has an even tooth count of equal to or less than twenty-two teeth, and wherein the difference in the tooth count between the larger and the smaller sprocket is exactly two teeth,
wherein the larger sprocket in an end side thereof that faces the smaller sprocket, along a portion of the circumference of the larger sprocket has an upshift region having an upshift recess formation, wherein the upshift region, when axially viewing the rear-wheel sprocket pairing in a relative state in which the smaller sprocket lies closer to the observer than the larger sprocket, is configured and disposed so as to permit on the rear-wheel sprocket pairing rotating in the clockwise direction about the sprocket axis a change of engagement of the bicycle roller chain from the larger to the smaller sprocket,
wherein on the larger sprocket the upshift recess formation is assigned only exactly one release tooth which by way of the design and orientation thereof, when interacting with the upshift recess formation during an upshift procedure from the larger sprocket to the smaller sprocket, is configured to be the last tooth that engages between a link plate pair of a chain link of the bicycle roller chain,
and
wherein the larger sprocket in the end side thereof that faces the smaller sprocket, along the circumference of the larger sprocket has a downshift region having a downshift recess formation, wherein the downshift region, when axially viewing the rear-wheel sprocket pairing in the relative state, is configured so as to permit on the rear-wheel sprocket pairing rotating in the clockwise direction about the sprocket axis a change of engagement of the bicycle roller chain from the smaller to the larger sprocket, wherein on the larger sprocket the downshift recess formation is assigned only exactly one catch tooth which by way of the design and orientation thereof, when interacting with the downshift recess formation during a downshift procedure from the smaller sprocket to the larger sprocket, is configured to be the first tooth that engages between link plates of a chain link of the bicycle roller chain.

2. The bicycle rear-wheel sprocket pairing according to claim 1, wherein the release tooth in the clockwise direction is directly contiguous to the upshift recess formation.

3. The bicycle rear-wheel sprocket pairing according to claim 1, wherein the larger sprocket along the entire circumference thereof has exactly one upshift region having an upshift recess formation and exactly one release tooth.

4. The bicycle rear-wheel sprocket pairing according to claim 1, wherein the catch tooth in the counterclockwise direction is directly contiguous to the downshift recess formation.

5. The bicycle rear-wheel sprocket pairing according to claim 1, wherein the larger sprocket along the entire circumference thereof has exactly one downshift region and exactly one catch tooth.

6. The bicycle rear-wheel sprocket pairing according to claim 1, wherein in the clockwise direction, when axially viewing the rear-wheel sprocket pairing in the relative state, k number of teeth lie between the release tooth and the catch tooth, wherein the release tooth and the catch tooth are not to be included in the count, and wherein k=T−d, where T is the tooth count of the larger sprocket and where d equals 5 or 7.

7. The bicycle rear-wheel sprocket pairing according to claim 6, wherein when T is divisible by 6 into integer numbers without a remainder, d equals 5, and when T is not divisible by 6 into integer numbers without a remainder, d equals 7.

8. The bicycle rear-wheel sprocket pairing according to claim 1, wherein in the clockwise direction, when axially viewing the rear-wheel sprocket pairing in the relative state, n number of teeth lie between the catch tooth of the larger sprocket and the release tooth of the larger sprocket, wherein the catch tooth and the release tooth are not to be included in the count, wherein n equals 3 or equals 5.

9. The bicycle rear-wheel sprocket pairing according to claim 8, wherein, when the tooth count of the larger sprocket is divisible by 6 into integer numbers without a remainder, n equals 3, and when the tooth count of the larger sprocket is not divisible by 6 into integer numbers without a remainder, n equals 5.

10. The bicycle rear-wheel sprocket pairing according to claim 1, wherein that the tooth side of the tooth contiguous to the release tooth of the larger sprocket in the clockwise direction that points away from the smaller sprocket lies closer to the smaller sprocket than the tooth surface of the next but one following this tooth in the clockwise direction; or/and wherein that the tooth side of the tooth following the catch tooth of the larger sprocket in the counterclockwise direction that points away from the smaller sprocket lies closer to the smaller sprocket than the tooth surface of the next but one following this tooth in the counterclockwise direction.

11. The bicycle rear-wheel sprocket pairing according to claim 1, wherein the larger sprocket or/and the smaller sprocket, alternating sequentially in the circumferential direction along at least one circumferential portion, have/has in each case one thinner tooth and one thicker tooth.

12. A bicycle rear-wheel sprocket cassette comprising:
a plurality of sprockets which are connected for conjointly rotating in a slip-free manner about the sprocket axis and have in each case a different tooth count,
wherein the plurality of sprockets comprises at least one bicycle rear-wheel sprocket pairing for engaging in a force-transmitting manner with a bicycle roller chain and rotatable about a sprocket axis, wherein the sprocket axis defines an axial direction running along the sprocket axis, a radial direction running so as to be orthogonal to the sprocket axis, and a circumferential direction encircling the sprocket axis, the at least one bicycle rear-wheel sprocket pairing comprising:

a larger sprocket; and a smaller sprocket which for rotating conjointly with the larger sprocket in a slip-free manner about the sprocket axis is connected to the larger sprocket so as to be coaxial with and axially directly adjacent to the latter, wherein the larger sprocket has an even tooth count of equal to or less than twenty-two teeth, and wherein the difference in the tooth count between the larger and the smaller sprocket is exactly two teeth, wherein the larger sprocket in an end side thereof that faces the smaller sprocket, along a portion of the circumference of the larger sprocket has an upshift region having an upshift recess formation, wherein the upshift region, when axially viewing the rear-wheel sprocket pairing in a relative state in which the smaller sprocket lies closer to the observer than the larger sprocket, is configured and disposed so as to permit on the rear-wheel sprocket pairing rotating in the clockwise direction about the sprocket axis a change of engagement of the bicycle roller chain from the larger to the smaller sprocket, wherein on the larger sprocket the upshift recess formation is assigned only exactly one release tooth which by way of the design and orientation thereof, when interacting with the upshift recess formation during an upshift procedure from the larger sprocket to the smaller sprocket, is configured to be the last tooth that engages between a link plate pair of a chain link of the bicycle roller chain, and wherein the larger sprocket in the end side thereof that faces the smaller sprocket, along the circumference of the larger sprocket has a downshift region having a downshift recess formation, wherein the downshift region, when axially viewing the rear-wheel sprocket pairing in the relative state, is configured so as to permit on the rear-wheel sprocket pairing rotating in the clockwise direction about the sprocket axis a change of engagement of the bicycle roller chain from the smaller to the larger sprocket, wherein on the larger sprocket the downshift recess formation is assigned only exactly one catch tooth which by way of the design and orientation thereof, when interacting with the downshift recess formation during a downshift procedure from the smaller sprocket to the larger sprocket, is configured to be the first tooth that engages between link plates of a chain link of the bicycle roller chain.

13. The bicycle rear-wheel sprocket cassette according to claim 12, wherein the plurality of sprockets has at least three sprockets which have in each case a different tooth count and are associated with two bicycle rear-wheel sprocket pairings, wherein the sprocket having the medium tooth count is the larger sprocket of the one rear-wheel sprocket pairing and the smaller sprocket of the other rear-wheel sprocket pairing.

14. The bicycle rear-wheel sprocket cassette according to claim 12, wherein all sprockets of the plurality of sprockets having tooth counts of twenty or less form the bicycle rear-wheel sprocket pairings.

15. The bicycle rear-wheel sprocket cassette according to claim 12, wherein the plurality of sprockets has a transition sprocket group comprising a 21-T sprocket having twenty-one teeth, a 18-T smaller sprocket having eighteen teeth being directly adjacent thereto.

16. The bicycle rear-wheel sprocket cassette according to claim 15, wherein the 21-T sprocket in the end side thereof that faces the 18-T sprocket, along a portion of the circumference of the 21-T sprocket has at least two upshift regions having in each case one upshift recess formation, wherein each upshift region, when axially viewing the transition sprocket group in a relative state in which the 18-T sprocket lies closer to the observer than the 21-T sprocket, is configured and disposed so as to permit on the transition sprocket group rotating in the clockwise direction about the sprocket axis a change of engagement of the bicycle roller chain from the 21-T sprocket to the 18-T sprocket, wherein on the 21-T sprocket each of the two upshift recess formations is in each case assigned only exactly one release tooth which by way of the design and orientation thereof, when interacting with the upshift recess formation assigned thereto during an upshift procedure from the 21-T sprocket to the 18-T sprocket, is configured to be the last tooth that engages between a link plate of a chain link of the bicycle roller chain wherein an even number of teeth lie between the release teeth of upshift recess formations that are adjacent in the circumferential direction, wherein the release teeth of the adjacent upshift recess formations are not to be included in the count; or/and the 21-T sprocket in the end side thereof that faces the 18-T sprocket, along the circumference of the 21-T sprocket has at least two downshift regions having in each case one downshift recess formation, wherein each downshift region, when axially viewing the transition sprocket group in the relative state, is configured so as to permit on the transition sprocket group rotating in the clockwise direction about the sprocket axis a change of engagement of the bicycle roller chain from the 18-T sprocket to the 21-T sprocket, wherein on the 21-T sprocket each downshift recess formation is in each case assigned exactly only one catch tooth which by way of the design and orientation thereof, when interacting with the downshift recess formation assigned thereto during a downshift procedure from the 18-T sprocket to the 21-T sprocket is configured to be the first tooth that engages between link plates of a chain link of the bicycle roller chain, wherein an even number of teeth lie between the catch teeth of downshift recess formations that are adjacent in the circumferential direction, wherein the catch teeth of the adjacent downshift recess formations are not to be included in the count.

17. The bicycle rear-wheel sprocket cassette according to claim 16, wherein the 21-T sprocket has exactly three upshift regions having in each case one upshift recess formation and in each case exactly one release tooth, wherein six teeth lie in each case between the release teeth of upshift recess formations that are adjacent in the circumferential direction, wherein the release teeth of the adjacent upshift recess formations are not to be included in the count; or/and the 21-T sprocket has exactly three downshift regions having in each case one downshift recess formation and in each case exactly one catch tooth, wherein six teeth lie in each case between the catch teeth of downshift recess formations that are adjacent in the circumferential direction, wherein the catch teeth of the adjacent downshift recess formations are not to be included in the count.

18. The bicycle rear-wheel sprocket cassette according to claim 16, wherein the transition sprocket group additionally has a 24-T sprocket having twenty-four number of teeth, wherein the 21-T sprocket is axially disposed between the 24-T sprocket and the 18-T sprocket.

19. The bicycle rear-wheel sprocket cassette according to claim 15, wherein a 24-T sprocket in the end side thereof that points towards the 21-T sprocket, along a portion of the circumference of the 24-T sprocket, has at least two upshift regions having in each case one upshift recess formation, wherein each upshift region, when axially viewing the transition sprocket group in a relative state in which the 21-T sprocket lies closer to the observer than the 24-T sprocket, is configured and disposed so as to permit on the transition sprocket group rotating in the clockwise direction about the sprocket axis a change of engagement of the bicycle roller chain from the 24-T sprocket to the 21-T sprocket, wherein on the 24-T sprocket each of the two upshift recess formations is assigned only exactly one release tooth which by way of the design and orientation thereof, when interacting with the upshift recess formation assigned thereto during an upshift procedure from the 24-T sprocket to the 21-T sprocket, is configured to be the last tooth that engages between a link plate of a chain link of the bicycle roller chain, wherein an uneven number of teeth lie between the release teeth of upshift recess formations that are adjacent in the circumferential direction, wherein the release teeth of the adjacent upshift recess formations are not to be included in the count; or/and the 24-T sprocket in the end side thereof that points towards the 21-T sprocket, along the circumference of the 24-T sprocket has at least two downshift regions having in each case one downshift recess formation, wherein each downshift region, when axially viewing the transition sprocket group in the reference state, is configured so as to permit on the transition sprocket group rotating in the clockwise direction about the sprocket axis a change of engagement of the bicycle roller chain from the 21-T sprocket to the 24-T sprocket, wherein the 24-T sprocket of each downshift recess formation is in each case assigned only exactly one catch tooth which by way of the design and the orientation thereof, when interacting with the downshift recess formation assigned thereto during a downshift procedure from the 21-T sprocket to the 24-T sprocket is configured to be the first tooth that engages between link plates of a chain link of the bicycle roller chain, wherein an uneven number of teeth lie between the catch teeth of downshift recess formations that are adjacent in the circumferential direction, wherein the catch teeth of the adjacent downshift recess formations are not to be included in the count.

20. The bicycle rear-wheel sprocket cassette according to claim 19, wherein the 24-T sprocket has exactly three upshift regions having in each case one upshift recess formation and in each case exactly one release tooth, wherein seven teeth lie in each case between the release teeth of upshift recess formations that are adjacent in the circumferential direction, wherein the release teeth of the adjacent upshift recess formations are not to be included in the count; or/and the 24-T sprocket has exactly three downshift regions having in each case one downshift recess formation and exactly one catch tooth, wherein seven teeth lie in each case between the catch teeth of downshift recess formations that are adjacent in the circumferential direction, wherein the catch teeth of the adjacent downshift recess formations are not to be included in the count.

21. The bicycle rear-wheel sprocket cassette according to claim 12 wherein the plurality of sprockets comprises twelve sprockets having the following tooth count increments: 10-12-14-16-18-21-24-28-32-38-44-52.

* * * * *